US009930546B2

(12) United States Patent
Zhang et al.

(10) Patent No.: US 9,930,546 B2
(45) Date of Patent: Mar. 27, 2018

(54) METHOD, APPARATUS, AND TERMINAL FOR POSITION GUIDANCE BASED ON RADIO SIGNAL QUALITY

(71) Applicant: Huawei Technologies Co., Ltd., Shenzhen (CN)

(72) Inventors: Huimin Zhang, Shenzhen (CN); Maosheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/483,144

(22) Filed: Apr. 10, 2017

(65) Prior Publication Data

US 2017/0215093 A1 Jul. 27, 2017

Related U.S. Application Data

(63) Continuation of application No. PCT/CN2015/080113, filed on May 28, 2015.

(30) Foreign Application Priority Data

Oct. 9, 2014 (CN) .......................... 2014 1 0528100

(51) Int. Cl.
*H04M 1/00* (2006.01)
*H04W 24/02* (2009.01)
(Continued)

(52) U.S. Cl.
CPC ........... *H04W 24/02* (2013.01); *H04W 4/023* (2013.01); *H04W 24/08* (2013.01)

(58) Field of Classification Search
CPC ...... H04W 24/02; H04W 4/023; H04W 24/08
(Continued)

(56) References Cited

U.S. PATENT DOCUMENTS 6,246,376 B1 * 6/2001 Bork ....................... G01S 1/047
342/357.34
8,396,483 B2 3/2013 Chater-Lea et al.
(Continued)

FOREIGN PATENT DOCUMENTS

CN 101895814 A 11/2010
CN 102202421 A 9/2011
(Continued)

OTHER PUBLICATIONS

Machine Translation and Abstract of Chinese Publication No. CN101895814, dated Nov. 24, 2010, 14 pages.
(Continued)

*Primary Examiner* — Chuck Huynh
(74) *Attorney, Agent, or Firm* — Conley Rose, P.C.

(57) ABSTRACT

Embodiments of the present disclosure provide a method, an apparatus, and a terminal for position guidance based on radio signal quality. The method includes, when it is determined that signal quality in a first position does not meet a preset condition, acquiring a target position in which signal quality meets the preset condition, where the first position is a position in which a first terminal is currently located; and displaying an indication icon on a status bar of a user interface of the first terminal, where the indication icon is used to instruct a user to move to the target position, and the user interface includes the status bar and a user operation area.

15 Claims, 6 Drawing Sheets

(51) Int. Cl.
*H04W 4/02* (2018.01)
*H04W 24/08* (2009.01)

(58) Field of Classification Search
USPC ............. 455/456.3, 404.2, 456.1, 456.2, 436
See application file for complete search history.

(56) References Cited

U.S. PATENT DOCUMENTS

| | | | |
|---|---|---|---|
| 9,338,747 B1 * | 5/2016 | Parthasarathy | ... H04W 52/0245 |
| 2012/0231743 A1 | 9/2012 | Mayer et al. | |
| 2013/0196681 A1 | 8/2013 | Poduri et al. | |

FOREIGN PATENT DOCUMENTS

| | | |
|---|---|---|
| CN | 102457891 A | 5/2012 |
| CN | 102577444 A | 7/2012 |
| CN | 103024672 A | 4/2013 |
| CN | 103416085 A | 11/2013 |
| CN | 104081844 A | 10/2014 |
| CN | 104301866 A | 1/2015 |
| CN | 106416349 A | 2/2017 |
| EP | 1235451 A1 | 8/2002 |

OTHER PUBLICATIONS

Machine Translation and Abstract of Chinese Publication No. CN102202421, dated Sep. 28, 2011, 10 pages.
Machine Translation and Abstract of Chinese Publication No. CN102457891, dated May 16, 2012, 11 pages.
Machine Translation and Abstract of Chinese Publication No. CN103024672, dated Apr. 3, 2013, 6 pages.
Machine Translation and Abstract of Chinese Publication No. CN103416085, dated Nov. 27, 2013, 16 pages.
Machine Translation and Abstract of Chinese Publication No. CN104301866, dated Jan. 21, 2015, 36 pages.
Machine Translation and Abstract of Chinese Publication No. CN106416349, dated Feb. 15, 2017, 3 pages.
Foreign Communication From a Counterpart Application, Chinese Application No. 2014105281001, Chinese Search Report dated Apr. 25, 2017, 2 pages.
Foreign Communication From a Counterpart Application, Chinese Application No. 2014105281001, Chinese Office Action dated May 3, 2017, 6 pages.
Foreign Communication Form A Counterpart Application, European Application No. 15848585.4, Extended European Search Report dated Aug. 3, 2017, 9 pages.
Foreign Communication Form A Counterpart Application, PCT Application No. PCT/CN2015/080113, English Translation of International Search Report dated Sep. 2, 2015, 2 pages.
Foreign Communication Form A Counterpart Application, PCT Application No. PCT/CN2015/080113, English Translation of Written Opinion dated Sep. 2, 2015, 6 pages.
"DirectionBar adds a live compass to your iPhone Status bar," iDownloadBlog, Mar. 8, 2013, 2 pages.
Foreign Communication From a Counterpart Application, Chinese Application No. 2014105281001, Chinese Search Report dated Oct. 11, 2017, 2 pages.
Foreign Communication From a Counterpart Application, Chinese Application No. 2014105281001, Chinese Office Action dated Oct. 23, 2017, 6 pages.

* cited by examiner

METHOD, APPARATUS, AND TERMINAL FOR POSITION GUIDANCE BASED ON RADIO SIGNAL QUALITY

CROSS-REFERENCE TO RELATED APPLICATIONS

This application is a continuation of International Application No. PCT/CN2015/080113, filed on May 28, 2015, which claims priority to Chinese Patent Application No. 201410528100.1, filed on Oct. 9, 2014. The disclosures of the aforementioned applications are hereby incorporated by reference in their entireties

TECHNICAL FIELD

Embodiments of the present disclosure relate to the communications field, and more particularly, to a method, an apparatus, and a terminal for position guidance based on radio signal quality.

BACKGROUND

Intelligent terminals have become a part of people's life. Making calls, sending short message service (SMS) messages, accessing the Internet, and the like by using intelligent terminals are all common applications. However, in a use process, a problem of poor signal quality is frequently encountered. In particular, in a call process, if signal quality is poor, a problem of very poor call quality or even call drop or call interruption is generally caused, and great inconvenience is caused to a user's life.

SUMMARY

The present disclosure provides a method, an apparatus, and a terminal for position guidance based on radio signal quality, which can, on a premise that a current operation task of a user is not affected, resolve a problem of guiding the user to move to a position in which signal quality meets a preset condition.

According to a first aspect, a method for position guidance based on radio signal quality is provided, where the method includes, when it is determined that signal quality in a first position does not meet a preset condition, acquiring a target position in which signal quality meets the preset condition, where the first position is a position in which a first terminal is currently located; and displaying an indication icon on a status bar of a user interface of the first terminal, where the indication icon is used to instruct a user to move to the target position, and the user interface includes the status bar and a user operation area.

With reference to the first aspect, in a first possible implementation manner of the first aspect, the indication icon is an arrow icon, and the method further includes adjusting a direction of an arrow in the indication icon in real time in a movement process of the first terminal, so that the arrow always points to the target position.

With reference to the first aspect or the first possible implementation manner of the first aspect, in a second possible implementation manner of the first aspect, the method further includes determining a guiding path from the first position to the target position, and displaying, in the user operation area, map information marked with the guiding path.

With reference to the second possible implementation manner of the first aspect, in a third possible implementation manner of the first aspect, the determining a guiding path from the first position to the target position includes determining the guiding path according to prestored measurement data of signal quality in a surrounding area of the first position, where the surrounding area of the first position includes the target position.

In a possible implementation manner of the first aspect, the method further includes, when it is determined that signal quality in a second position in which the first terminal is located meets the preset condition before the first terminal arrives at the target position, hiding the indication icon, or changing the indication icon from a directional state to a nondirectional state.

In a possible implementation manner of the first aspect, the method further includes, when it is determined that the first terminal arrives at the target position and that signal quality in the target position meets the preset condition, hiding the indication icon, or changing the indication icon from a directional state to a nondirectional state.

In a possible implementation manner of the first aspect, the acquiring a target position in which signal quality meets the preset condition includes acquiring signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; determining at least one candidate position according to the signal quality in the positions in which the at least two second terminals are respectively located, where the at least one candidate position includes a position in which signal quality meets the preset condition in the positions in which the at least two second terminals are respectively located; and determining the target position in the at least one candidate position.

In a possible implementation manner of the first aspect, the determining the target position in the at least one candidate position includes determining a position of best signal quality in the at least one candidate position, as the target position; or determining a position that is closest to the first position and in the at least one candidate position, as the target position; or determining the target position according to a user instruction by displaying the at least one candidate position to the user.

In a possible implementation manner of the first aspect, the method is performed by the first terminal; and the acquiring a target position in which signal quality meets the preset condition includes sending, to a network device, a request message that is used to request to recommend a position in which signal quality meets the preset condition; receiving at least one recommended position that is sent by the network device according to the request message, where signal quality in the at least one recommended position meets the preset condition; and determining the target position according to the at least one recommended position.

According to a second aspect, a method for position guidance based on radio signal quality is provided, where the method includes determining, by a first terminal, whether signal quality in a first position meets a preset condition, where the first position is a position in which the first terminal is currently located; when determining that the signal quality in the first position does not meet the preset condition, acquiring, by the first terminal, a target position in which signal quality meets the preset condition; and displaying, by the first terminal, indication information that is used to instruct a user to move to the target position.

With reference to the second aspect, in a first possible implementation manner of the second aspect, the acquiring, by the first terminal, a target position in which signal quality meets the preset condition includes acquiring, by the first terminal, signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; determining, by the first terminal, at least one candidate position according to the signal quality in the positions in which the at least two second terminals are respectively located, where the at least one candidate position includes a position in which signal quality meets the preset condition in the positions in which the at least two second terminals are respectively located; and determining, by the first terminal, the target position in the at least one candidate position.

In a second possible implementation manner of the second aspect, the determining, by the first terminal, the target position in the at least one candidate position includes determining, by the first terminal, a position of best signal quality in the at least one candidate position, as the target position; or determining, by the first terminal, a position that is closest to the first position and in the at least one candidate position, as the target position; or determining, by the first terminal, the target position according to a user instruction by displaying the at least one candidate position to the user.

In a possible implementation manner of the second aspect, the acquiring, by the first terminal, a target position in which signal quality meets the preset condition includes sending, by the first terminal to a network device, a request message that is used to request to recommend a position in which signal quality meets the preset condition; receiving, by the first terminal, at least one recommended position that is sent by the network device according to the request message, where signal quality in the at least one recommended position meets the preset condition; and determining, by the first terminal, the target position according to the at least one recommended position.

In a possible implementation manner of the second aspect, a form of the indication information is any one of the following manners or a combination of multiple manners: an icon, a text, a voice, and a map.

According to a third aspect, an apparatus for position guidance based on radio signal quality is provided, where the apparatus includes: an acquiring module configured to, when it is determined that signal quality in a first position does not meet a preset condition, acquire a target position in which signal quality meets the preset condition, where the first position is a position in which a first terminal is currently located; and a displaying module configured to display an indication icon on a status bar of a user interface of the first terminal, where the indication icon is used to instruct a user to move to the target position acquired by the acquiring module, and the user interface includes the status bar and a user operation area.

In a possible implementation manner of the third aspect, the indication icon displayed by the displaying module is an arrow icon, and the apparatus further includes an adjusting module configured to adjust a direction of an arrow in the indication icon in real time in a movement process of the first terminal, so that the arrow always points to the target position.

In a second possible implementation manner of the third aspect, the apparatus further includes a determining module configured to determine a guiding path from the first position to the target position, where the displaying module is further configured to display, in the user operation area, map information marked with the guiding path determined by the determining module.

In a possible implementation manner of the third aspect, the determining module is configured to determine the guiding path according to prestored measurement data of signal quality in a surrounding area of the first position, where the surrounding area of the first position includes the target position.

In a possible implementation manner of the third aspect, the displaying module is further configured to, when it is determined that signal quality in a second position in which the first terminal is located meets the preset condition before the first terminal arrives at the target position, hide the indication icon, or change the indication icon from a directional state to a nondirectional state.

In a possible implementation manner of the third aspect, the displaying module is further configured to, when it is determined that the first terminal arrives at the target position and that signal quality in the target position meets the preset condition, hide the indication icon, or change the indication icon from a directional state to a nondirectional state.

In a possible implementation manner of the third aspect, the acquiring module includes an acquiring unit configured to acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; a first determining unit configured to determine at least one candidate position according to the signal quality in the positions in which the at least two second terminals are respectively located that is acquired by the acquiring unit, where the at least one candidate position includes a position in which signal quality meets the preset condition in the positions in which the at least two second terminals are respectively located; and a second determining unit configured to determine the target position in the at least one candidate position determined by the first determining unit.

In a possible implementation manner of the third aspect, the second determining unit is configured to determine a position of best signal quality in the at least one candidate position, as the target position; or the second determining unit is specifically configured to determine a position that is closest to the first position and in the at least one candidate position, as the target position; or the second determining unit is specifically configured to determine the target position according to a user instruction by displaying the at least one candidate position to the user.

In a possible implementation manner of the third aspect, the apparatus is the first terminal; and the acquiring module includes a sending unit configured to send, to a network device, a request message that is used to request to recommend a position in which signal quality meets the preset condition; a receiving unit configured to receive at least one recommended position that is sent by the network device according to the request message, where signal quality in the at least one recommended position meets the preset condition; and a third determining unit configured to determine the target position according to the at least one recommended position received by the receiving unit.

According to a fourth aspect, a terminal is provided, where the terminal includes a determining module configured to determine whether signal quality in a first position meets a preset condition, where the first position is a position in which the terminal is currently located; an acquiring module configured to, when the determining module determines that the signal quality in the first position does not meet the preset condition, acquire a target position in which signal quality meets the preset condition; and a displaying module configured to display indication information that is used to instruct a user to move to the target position acquired by the acquiring module.

In a possible implementation manner of the fourth aspect, the acquiring module includes: an acquiring unit configured to acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; a first determining unit configured to determine at least one candidate position according to the signal quality in the positions in which the at least two second terminals are respectively located that is acquired by the acquiring unit, where the at least one candidate position includes a position in which signal quality meets the preset condition in the positions in which the at least two second terminals are respectively located; and a second determining unit configured to determine the target position in the at least one candidate position determined by the first determining unit.

In a possible implementation manner of the fourth aspect, the second determining unit is specifically configured to determine a position of best signal quality in the at least one candidate position, as the target position; or the second determining unit is specifically configured to determine a position that is closest to the first position and in the at least one candidate position, as the target position; or the second determining unit is specifically configured to determine the target position according to a user instruction by displaying the at least one candidate position to the user.

In a possible implementation manner of the fourth aspect, the acquiring module includes a sending unit configured to send, to a network device, a request message that is used to request to recommend a position in which signal quality meets the preset condition; a receiving unit configured to receive at least one recommended position that is sent by the network device according to the request message, where signal quality in the at least one recommended position meets the preset condition; and a third determining unit configured to determine the target position according to the at least one recommended position received by the receiving unit.

With reference to any one of the fourth aspect and the first possible implementation manner to the third possible implementation manner of the fourth aspect, in a fourth possible implementation manner of the fourth aspect, a form of the indication information displayed by the displaying module is any one of the following manners or a combination of multiple manners: an icon, a text, a voice, and a map.

Based on the foregoing technical solutions, according to the method, apparatus, and terminal for position guidance based on radio signal quality that are provided by the embodiments of the present disclosure, an indication icon is displayed on a status bar, where the indication icon is used to guide a user to move from a position in which the user is currently located and in which signal quality does not meet a preset condition to a target position in which signal quality meets the preset condition. Therefore, on a premise that a current operation task of the user is not affected, the user can be effectively guided to move to a position of better signal quality, and user experience can be improved effectively.

BRIEF DESCRIPTION OF DRAWINGS

To describe the technical solutions in the embodiments of the present disclosure more clearly, the following briefly introduces the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should also be understood that in the embodiments of the present disclosure, a terminal may be referred to as user equipment (UE), a mobile station (MS), a mobile terminal, a user terminal, or the like. The terminal may communicate with one or more core networks by using a radio access network (RAN). For example, the terminal may be a mobile phone (also referred to as a cellular phone) or a computer with a mobile terminal. For example, the terminal may also be a portable, pocket-sized, handheld, computer built-in, or in-vehicle mobile apparatus, which exchanges voice and/or data with the radio access network.

Figure 1:
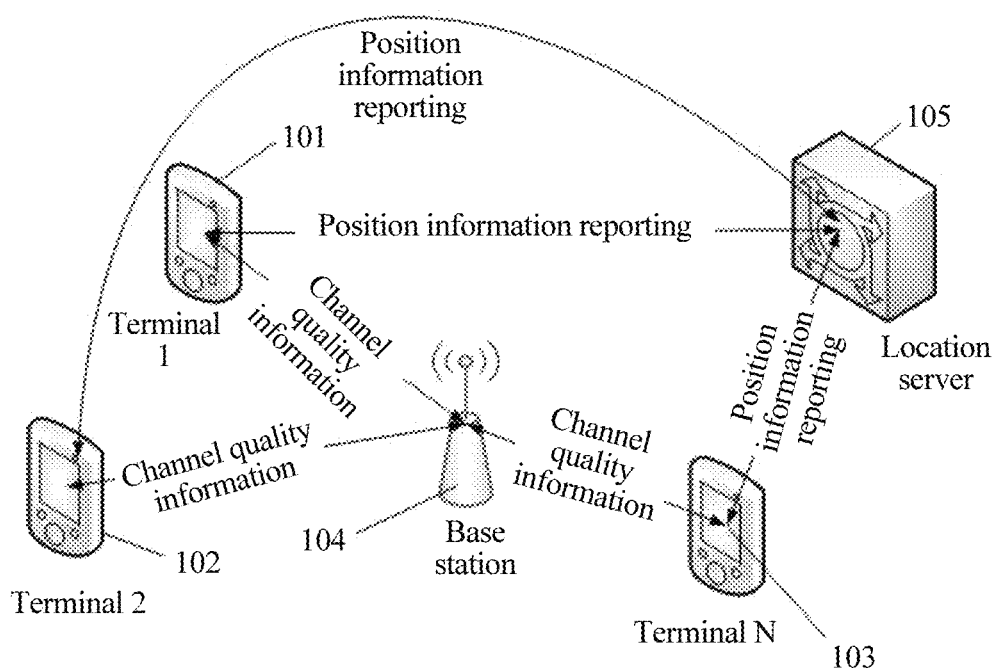
FIG. 1 is a schematic architecture diagram of a system according to an embodiment of the present disclosure.

For ease of understanding the embodiments of the present disclosure, FIG. 1 shows an architecture diagram of a system according to an embodiment of the present disclosure. As shown in FIG. 1, the system includes a terminal (shown by 101, 102, and 103), base station 104, and a location server 105 that is on a network side. For brevity, FIG. 1 only exemplarily shows three terminals. In an actual application, more terminals may be included.

Specifically, the terminal is, for example, an intelligent terminal, and may have one or more wireless communications modules, and support in reporting channel quality information (equivalent to signal quality in a position in which the terminal is currently located) to an associated base station, for example, the base station 104 shown in FIG. 1, and further support in reporting information about a geographic position in which the terminal is located to the location server 105.

Specifically, the base station 104 is, for example, a cellular base station, and may provide an access service to the terminal, and support acquisition of channel quality information of the terminal. Optionally, the base station 104 receives and temporarily stores position information reported by the terminal; or requests position information of the terminal from the location server 105 on the network side, or the like.

Optionally, the base station 104 further supports, when receiving a request that is sent by the terminal and used to request to recommend a position in which signal quality meets a preset condition, in providing a position recommendation and indication according to channel quality information and position information of each terminal in a coverage cell; or forwards a request to the location server 105 on the network side, so that the location server 105 completes position recommendation processing.

The location server 105 is configured to store the position information of the terminal. Specifically, there are multiple approaches for acquiring the position information of the terminal by the location server 105, for example, receiving the position information reported by the terminal; or receiving the position information of the terminal that is reported by the base station 104; or self-calculating the position information of the terminal by means of positioning.

Optionally, the location server 105 may further recommend and indicate a nearby position of better signal quality to the terminal according to the position information and signal quality of the terminal.

Specifically, for example, the terminal 101 may implement services such as a call or network access by establishing a communication connection with the base station 104. When the terminal 101 detects that signal quality in the position in which the terminal 101 is located is poor (does not meet the preset condition), if a normal call requirement cannot be met, the terminal 101 requests the base station 104 or the location server 105 to recommend a position of better signal quality (for example, may meet the normal call requirement). When the base station 104 receives the request that is sent by the terminal 101 and used to request to recommend the position information of better signal quality, the base station 104 provides a position recommendation and indication according to collected channel quality information and position information of other terminals in the cell; or forwards the request to the location server 105 on the network side, so that the location server 105 completes related position recommendation processing. When the location server 105 receives the request that is sent by the terminal 101 and used to request to recommend the position information of better signal quality, the location server 105 provides a position recommendation and indication according to channel quality information and position information of other terminals in the cell.

It should be understood that the other terminals in the cell mentioned above include but are not limited to the terminals 102 and 103 shown in FIG. 1.

Figures 2A, 2B:
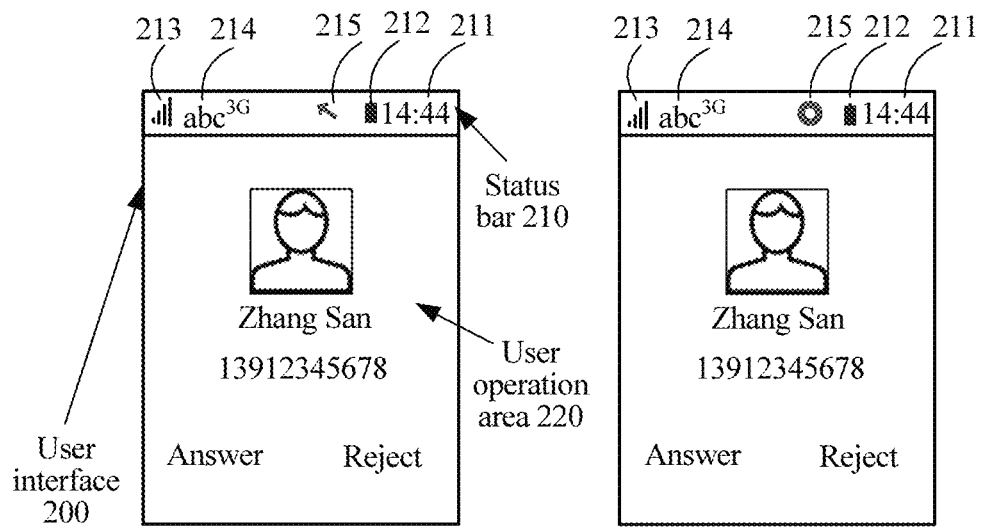
FIG. 2A and FIG. 2B show schematic diagrams of user interfaces of a terminal according to an embodiment of the present disclosure.

For ease of understanding the embodiments of the present disclosure, the following describes a user interface (UI) of a terminal according to an embodiment of the present disclosure. FIG. 2A shows a UI of a terminal according to an embodiment of the present disclosure. As shown in FIG. 2A, the UI of the terminal includes a status bar 210 and a user operation area 220. The status bar 210 is used to display some indication icons, for example, an icon 211 used to indicate time information, an icon 212 used to indicate remaining power, an icon 213 used to indicate signal quality, and an icon 214 used to indicate a type of a network that is accessed by the terminal, and may further display an icon used to indicate a system push message (not shown in FIG. 2A), and the like. The user operation area 220 is used to display a task that is performed by a user currently, for example, call answering shown in FIG. 2, and for another example, any operation task such as SMS message editing and web browsing.

It should be understood that adding, deleting, or modifying any one or more indication icons on the status bar 210 does not affect a displayation effect of a task that is performed by the terminal currently in the user operation area 220. For example, when the user is reading, by using the user operation area 220, an article shared in moments in WECHAT, an indication icon used to indicate system push information is added to the status bar 210. In this case, the user may learn that there is system push information, and may also continue a current action of reading the article; the user may further open, at a time according to the user's will, the indication icon used to indicate the system push information, to view a text of the system push information.

In FIG. 2A, the status bar 210 is located at an uppermost end at a short edge of the terminal. It should be understood that as a spatial placement position of the terminal changes, the status bar 210 may also change adaptively. Assuming that the terminal rotates clockwise by 90° from a spatial position shown in FIG. 2A, that is, a placement position of the terminal is a lying rectangle, the status bar 210 may change to an uppermost end at a long edge of the terminal. It should also be understood that the status bar 210 may also be hidden. For example, when a finger of the user slides on the UI from bottom to top, the status bar 210 is hidden; when the finger of the user slides on the UI from top to bottom, the status bar 210 is displayed again. It should also be understood that other operating mechanisms may also be used to control hiding and displaying of the status bar 210, which is not limited by this embodiment of the present disclosure.

It should be understood that the example shown in FIG. 2A is to help a person skilled in the art to better understand this embodiment of the present disclosure instead of limiting the scope of this embodiment of the present disclosure. As the spatial placement position of the terminal changes, the status bar 210 and the user operation area 220 may have different relative positions, which is not limited by this embodiment of the present disclosure, as long as it is ensured that the user can view and/or control the status bar 210 conveniently, regardless of the spatial placement position in which the terminal is located.

Figure 3:
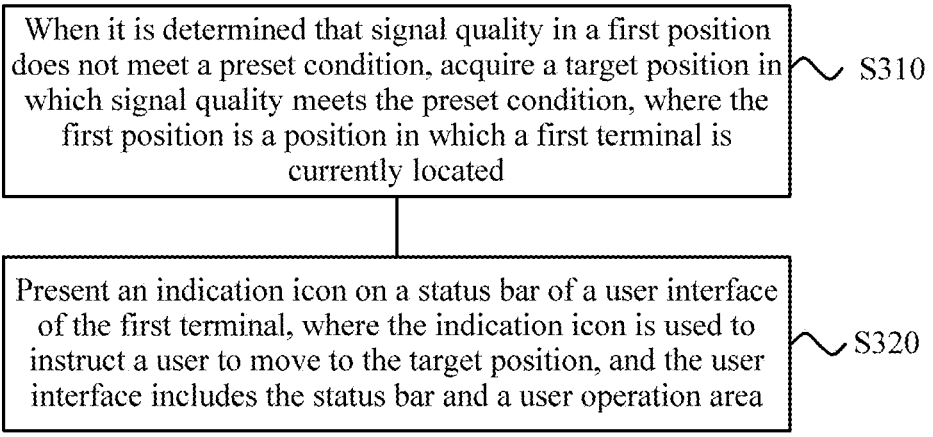
FIG. 3 is a schematic flowchart of a method for position guidance based on radio signal quality according to an embodiment of the present disclosure.

FIG. 3 shows a method 300 for position guidance based on radio signal quality according to an embodiment of the present disclosure. The method 300 may be performed by, for example, a terminal or a network device, where the network device may be a base station or a server, or a combination of a base station and a server, which is not limited by this embodiment of the present disclosure. As shown in FIG. 3, the method 300 includes the following steps.

S310. When it is determined that signal quality in a first position does not meet a preset condition, acquire a target position in which signal quality meets the preset condition, where the first position is a position in which a first terminal is currently located.

S320. Display an indication icon on a status bar of a user interface of the first terminal, where the indication icon is used to instruct a user to move to the target position, and the user interface includes the status bar and a user operation area.

Therefore, in the method for position guidance based on radio signal quality according to the embodiment of the present disclosure, an indication icon is displayed on a status bar, where the indication icon is used to guide a user to move from a position in which the user is currently located and in which signal quality does not meet a preset condition to a target position in which signal quality meets the preset condition. Therefore, on a premise that a current operation task of the user is not affected, the user can be effectively guided to move to a position of better signal quality, and user experience can be improved effectively.

In step S310, the first terminal itself may perform detection and determine whether signal quality in the position in which the first terminal is currently located meets the preset condition; or the first terminal may detect, in real time, signal quality in the position in which the first terminal is currently located, and report the signal quality to a network device, and the network device determines whether the signal quality in the position in which the first terminal is currently located meets a requirement of the preset condition.

The signal quality in the position in which the first terminal is currently located refers to channel quality of an associated link between the position in which the first terminal is currently located and a serving base station of a cell in which the first terminal is located. Specifically, the first terminal may periodically detect, by using a channel quality indication (CQI) mechanism, the signal quality in the position in which the first terminal is currently located. It should be understood that the CQI is a criterion for measuring communication quality of a radio channel, and may be obtained through calculation according to the following channel performance indicators: a signal to noise ratio (SNR), a signal to interference plus noise ratio (SINR), or a signal to noise and distortion ratio (SNDR), or other channel quality performance indicators.

The foregoing preset condition may be understood as a signal quality threshold. Specifically, the preset condition may be any one of the following indicators or a combination of multiple indicators. The preset condition may be a threshold set for a channel quality performance indicator, for example, a threshold set for the SNR, the SINR, or the SNDR, or other channel quality performance indicators. The preset condition is not necessarily a threshold of a specific channel quality performance indicator, and may also be an evaluation system for multiple parameters. For example, the preset condition indicates a first threshold that the SNR needs to reach, a second threshold that the SINR needs to reach, and a third threshold that the SNDR needs to reach. That is, the preset condition is an evaluation system for measuring signal quality. It should also be understood that the preset condition may be configured by the user at discretion; or may be configured specifically according to a requirement, on signal quality, of a type of a service currently performed by the first terminal; or may be configured according to an importance level of the user, where a higher user level indicates a higher requirement of the preset condition.

In step S310, when it is determined that signal quality in the first position does not meet the preset condition, the first terminal may actively acquire the target position in which signal quality meets the preset condition, for example, request other terminals nearby to report respective position information and signal quality information; or after the network device determines the target position in which signal quality meets the preset condition, the network device delivers the target position to the first terminal, which is not limited by this embodiment of the present disclosure.

The following describes in detail the two methods for acquiring the target position.

In step S320, the indication icon used to instruct the user to move to the target position is displayed on the status bar of the UI of the first terminal. Specifically, the indication icon may be an arrow icon 215 shown in FIG. 2A.

Optionally, in this embodiment of the present disclosure, the indication icon is an arrow icon, and the method further includes: adjusting a direction of an arrow in the indication icon in real time in a movement process of the first terminal, so that the arrow always points to the target position.

Specifically, the direction of the indication icon is adjusted in real time according to a real-time movement status and a position of the user in a process in which the user moves towards the target position, so that the indication icon points to the target position.

As shown in FIG. 2A, optionally, in this embodiment of the present disclosure, an indication icon 212 used to indicate remaining power of the first terminal and/or an indication icon 211 used to indicate clock information is further displayed on the status bar.

It is explained above that in this embodiment of the present disclosure, adding, deleting, or modifying any one or more indication icons on the status bar does not affect a displayation effect of a task that is performed by the terminal currently in the user operation area. Therefore, in this embodiment of the present disclosure, the indication icon is displayed on the status bar to instruct the user to move to the target position in which signal quality meets the preset condition, on one hand, the user may be reminded in time to move to the target position to acquire better signal quality; on the other hand, impact on the current operation task of the user on the terminal is avoided, and user experience can be improved effectively.

It should be understood that in this embodiment of the present disclosure, regardless of a spatial placement position in which the terminal is located, the user may view the status bar conveniently, and may further view the indication icon that is used to instruct the user to arrive at the target position, and therefore may move to the target position of better signal quality in time.

Therefore, in this embodiment of the present disclosure, the indication icon that is used to guide the user to arrive at the target position is displayed on the status bar of the user interface of the terminal, which ensures that the user may conveniently view the indication icon no matter what task the terminal is currently performing and therefore may move to the target position of better signal quality in time. That is, the method for position guidance based on radio signal quality according to this embodiment of the present disclosure does not affect the operation task currently performed by the user by using the terminal, when the indication icon is used to guide the user to arrive at the target position, and therefore, user experience can be improved effectively.

Optionally, in this embodiment of the present disclosure, the method 300 further includes the following steps, not shown in FIG. 3.

S330. Determine a guiding path from the first position to the target position.

S340. Display, in the user operation area, map information marked with the guiding path.

In step S330, multiple methods may be used to determine the guiding path from the first position to the target position. For example, a feasible route from the first position to the target position is acquired according to the map information, and the guiding path is determined accordingly; or the guiding path may be determined according to measurement data of signal quality of a surrounding area (the area includes the target position) of the first position.

Optionally, in this embodiment of the present disclosure, the determining a guiding path from the first position to the target position in step S330 includes determining the guiding path according to prestored measurement data of signal quality in a surrounding area of the first position, where the surrounding area of the first position includes the target position.

Specifically, the measurement data of signal quality in the surrounding area of the first position refers to a signal quality sampling value of a sampling point of each position in the surrounding area (specifically, for example, a measurement value of an SINR or a received signal strength indicator (RSSI)). The measurement data of signal quality may be measured manually beforehand, and stored in the network device, for example, stored in a network server. The network device may determine the guiding path from the first position to the target position according to the measurement data of signal quality, and then deliver the guiding path to the first terminal, so that the guiding path is displayed on the terminal with reference to a map. Alternatively, the first terminal may request the network device to acquire the measurement data of signal quality, and then the first terminal selects, based on the measurement data of signal quality an appropriate guiding path from the first position to the target position.

Optionally, signal quality in positions that the guiding path determined according to the measurement data of signal quality passes through in sequence in a direction from the first position to the target position becomes better gradually; or average signal quality in positions that the guiding path passes through is better than that in other paths, which is not limited by this embodiment of the present disclosure.

It should be understood that selection of a guiding path in which signal quality changes from weak signal quality to strong signal quality is advantageous to improving user experience.

In step S340, a map interface marked with the guiding path that is determined in step S330 and that is from the first position to the target position is displayed in the user operation area, to guide the user to move from the first position to the target position. Further, the position in which the terminal is currently located may be displayed on the map interface in real time (for example, an icon marked with the current position is displayed), so that the user knows a distance and/or a position relationship between the position in which the user is currently located and the target position.

Further, in this embodiment of the present disclosure, the method 300 further includes displaying text information (for example, an SMS message) or playing voice information (for example, "at the left front, a signal in a position with a distance of 3 meters is better, so please move to a position A") to the user, to remind the user to move to the target position.

When it is determined that the user moves to the target position and that signal quality in the target position meets the preset condition, the user may be reminded to stop moving.

Optionally, in this embodiment of the present disclosure, the method 300 further includes, when it is determined that signal quality in a second position in which the first terminal is located meets the preset condition before the first terminal arrives at the target position, hiding the indication icon, or changing the indication icon from a directional state to a nondirectional state.

Specifically, for example, the indication icon includes two statuses, an arrow icon and a circle icon (for example, different statuses of the icon 215 shown in FIG. 2A and FIG. 2B), and the status of the arrow icon may be displayed in a process of guiding the user to arrive at the target position (for example, the icon 215 shown in FIG. 2A); when it is determined that the first terminal arrives at the target position and it is detected that signal quality in the target position meets the preset condition indeed, the indication icon may be changed to the status of the circle icon (for example, the icon 215 shown in FIG. B), to remind the user that signal quality in the current position may meet the preset condition and that the user may stop moving.

Further, in this embodiment of the present disclosure, in the process in which the first terminal moves towards the target position, signal quality in the position in which the first terminal is currently located is detected in real time, and whether signal quality in the position in which the first terminal is currently located meets the preset condition is monitored in real time. If it is detected that signal quality in the second position in which the first terminal is currently located meets the preset condition before the first terminal arrives at the target position, a related indication may be displayed to the user, to remind the user that signal quality in the current position of the user meets the preset condition and that the user may stop moving.

Optionally, in this embodiment of the present disclosure, the method 300 further includes, when it is determined that the first terminal arrives at the target position and that signal quality in the target position meets the preset condition, hiding the indication icon, or changing the indication icon from a directional state to a nondirectional state.

Specifically, in the process in which the first terminal moves towards the target position, before a position in which signal quality meets the preset condition is detected, the indication icon on the status bar displays a directional state and points to the target position in real time. When it is detected that signal quality in the second position in the path meets a preset threshold, the status of the indication icon on the status bar is changed to a nondirectional state, for example, a circle or a solid circle; or the indication icon on the status bar is hidden. In this way, the user is reminded that signal quality in the current position of the user can meet a requirement of the preset condition, and that the user may stop moving.

Therefore, in this embodiment of the present disclosure, whether signal quality in a position in which a terminal is located meets a preset condition is monitored in real time, so that signal quality in the current position can be learned in time; a corresponding indication icon is displayed on a status bar, so that a user can be guided effectively in time to move to a position of better signal quality, and the user can also be reminded in time to stop moving when signal quality meets the preset condition.

Further, after it is detected that the first terminal moves to the position in which signal quality meets the preset condition, text information may further be displayed to the user or voice information may further be played for the user, to remind the user to stop moving.

Therefore, in the method for position guidance based on radio signal quality according to this embodiment of the present disclosure, an indication icon is displayed on a status bar, a user is reminded of signal quality in a position in which the user is currently located, and if the signal quality in the position in which the user is currently located is poor, the user may be guided to arrive at a target position of better signal quality. Therefore, on a premise that a current operation of the terminal is not affected, the user can be effectively guided to move to a position of better signal quality, and user experience can be improved effectively.

Optionally, because signal quality is time-varying, a case in which signal quality in the target position does not meet the preset condition may occur after the user arrives at the target position. In this case, related actions of steps S310 and S320 may be performed again, finally guiding the user to arrive at a position in which signal quality meets the preset condition.

The following describes two methods for acquiring the target position in step S310.

Optionally, in this embodiment of the present disclosure, the acquiring a target position in which signal quality meets the preset condition in step S310 includes the following steps, not shown in FIG. 3.

S311. Acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold.

S312. Determine at least one candidate position according to the signal quality in the positions in which the at least two second terminals are respectively located, where the at least one candidate position includes a position in which signal quality meets the preset condition in the positions in which the at least two second terminals are respectively located.

S313. Determine the target position in the at least one candidate position.

Specifically, in step S311, a request may be sent to at least two second terminals around the first position, where the request is used to request to report signal quality in positions of the at least two second terminals; signal quality reported by the at least two second terminals is received; and then signal quality in the positions in which the at least two second terminals are respectively located is acquired. The preset threshold may be set by the user, or may be preset by a system, which is not limited by this embodiment of the present disclosure.

It should be understood that positioning information of the positions in which the at least two second terminals are located may be directly requested from the at least two second terminals, or may by requested from a location server, which is not limited by this embodiment of the present disclosure.

It should also be understood that in this embodiment of the present disclosure, each second terminal included in the at least two second terminals is not necessarily a terminal that belongs to a same serving base station as the first terminal, which is not limited by this embodiment of the present disclosure, as long as a distance from a position in which the second terminal is currently located to the first terminal is less than the preset threshold.

In step S312, all positions in which signal quality meets the preset condition are screened out from position information of the at least two terminals.

In step S313, if the at least one candidate position includes only one position, the at least one candidate position is determined as the target position. If the at least one candidate position includes two or more than two positions, the target position may be determined from the positions according to a specific screening principle.

Optionally, in this embodiment of the present disclosure, the determining the target position in the at least one candidate position in step S313 includes determining a position of best signal quality in the at least one candidate position, as the target position; or determining a position that is closest to the first position and in the at least one candidate position, as the target position; or determining the target position according to a user instruction by displaying the at least one candidate position to the user.

Specifically, position information of the at least one candidate position is displayed to the user, so that the user may be instructed to select an ideal position, and then the position determined by the user is used as the target position.

Further, a third threshold whose distance is less than the preset threshold may be set. Positions whose distances from the first position are less than or equal to the third threshold are selected from a candidate position set, and then a position of best signal quality is selected from these positions, as the target position.

It should be understood that in the method for position guidance based on radio signal quality according to this embodiment of the present disclosure, a terminal actively determines a target position, and can determine a more preferred target position in a case of fully considering features of the terminal, for example, determine, based on factors such as software and hardware performance conditions of the terminal, a surrounding geographic environment of a position in which the terminal is currently located, or user preference information, a target position in which signal quality meets a requirement, so that an indication icon used to point to the target position is displayed on a status bar to guide a user to move to the target position, and a problem of guiding the user to move from a position of poor signal quality to a target position of better signal quality can be resolved effectively.

It should also be understood that the method 300 for position guidance based on radio signal quality as shown in FIG. 3 may be performed by the network device. If the network device collects beforehand position information and signal quality information of a position in which each terminal (corresponding to the foregoing at least two second terminals) in a serving cell is located, at least one candidate position may be determined directly from stored information, and then a target position is determined. That is, when the method is performed by the network device, step S311 may be omitted.

It should also be understood that the method 300 for position guidance based on radio signal quality as shown in FIG. 3 may further be performed by the first terminal. In addition to the method for acquiring a target position in steps S311, S312, and S313, the target position may also be acquired by using the method for requesting the network device to recommend the target position.

Optionally, in this embodiment of the present disclosure, the method 300 is performed by the first terminal.

The acquiring a target position in which signal quality meets the preset condition in step S310 includes the following steps which are not shown in FIG. 3:

S314. Send, to a network device, a request message that is used to request to recommend a position in which signal quality meets the preset condition.

S315. Receive at least one recommended position that is sent by the network device according to the request message, where signal quality in the at least one recommended position meets the preset condition.

S316. Determine the target position according to the at least one recommended position.

Figure 5:
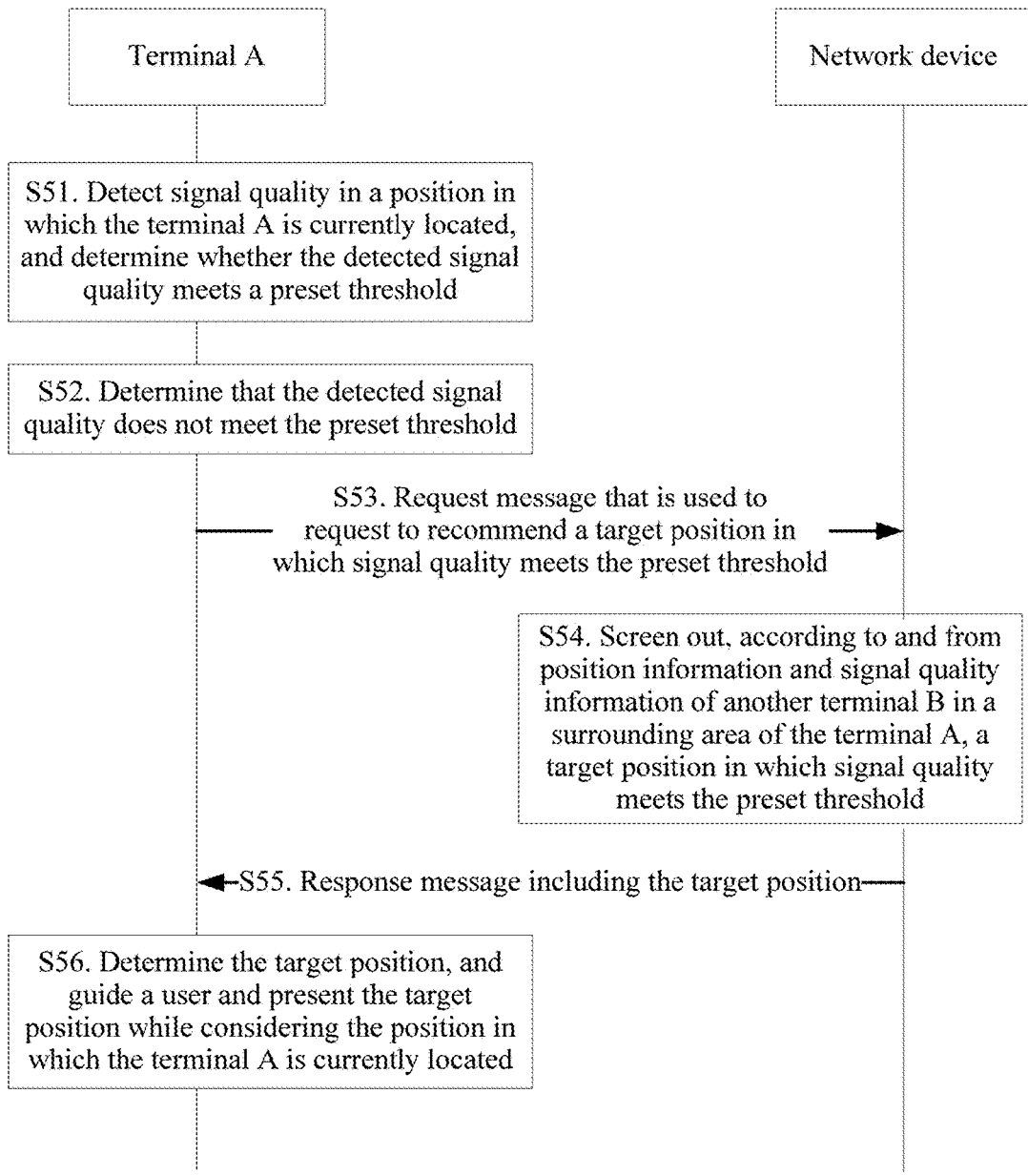
FIG. 5 is a schematic flowchart of a method for position guidance based on radio signal quality according to still another embodiment of the present disclosure.

Specifically, for example, the first terminal is a terminal A, and as shown in FIG. 5, in step S51, the terminal A detects signal quality in a position in which the terminal A is currently located, and determines whether the detected signal quality meets a preset condition; in step S52, the terminal A determines that the detected signal quality does not meet the preset condition; in step S53, the terminal A sends, to a network device, a request message that is used to request to recommend a target position of better signal quality; in step S54, the network device acquires position information and signal quality information of another terminal B in a surrounding area of the terminal A, screens out, from the position information and the signal quality information, a position B that is relatively close to the terminal A and in which signal quality meets the preset condition, and uses the position B as the target position; in step S55, the network device sends, according to the request message in step S53, a response message including the target position to the terminal A; in step S56, the terminal A guides a user and displays the target position while considering the position in which the terminal A is currently located, so that the user obtains better signal quality.

Specifically, if the at least one recommended position includes only one position, the at least one recommended position is used as the target position. If the at least one recommended position includes two or more different positions, a position of best signal quality may be selected from the at least one recommended position and used as the target position; or a position closest to the first position (the position in which the first terminal is currently located) may be selected from the at least one recommended position and used as the target position; or the at least one recommended position may be displayed to the user, or further, signal quality of the at least one recommended position may be displayed to the user, so that the user selects an ideal position from the at least one recommended position, and further determines the target position according to a user instruction.

Therefore, in the method for position guidance based on radio signal quality according to this embodiment of the present disclosure, an indication icon is displayed on a status bar, where the indication icon is used to guide a user to move from a position in which the user is currently located and in which signal quality is poor to a target position of better signal quality. Therefore, on a premise that a current operation task of the user is not affected, the user can be effectively guided to move to the position of better signal quality.

Figure 4:
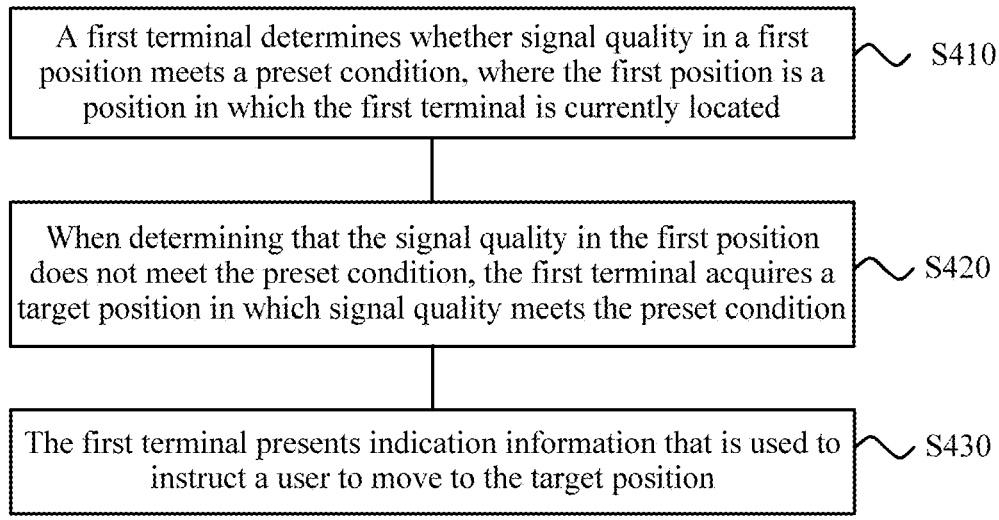
FIG. 4 is a schematic flowchart of a method for position guidance based on radio signal quality according to another embodiment of the present disclosure.

FIG. 4 shows a method 400 for position guidance based on radio signal quality according to another embodiment of the present disclosure. The method may be performed by, for example, a terminal (referred to as a first terminal below), and the method 400 includes the following steps.

S410. A first terminal determines whether signal quality in a first position meets a preset condition, where the first position is a position in which the first terminal is currently located.

S420. When determining that the signal quality in the first position does not meet the preset condition, the first terminal acquires a target position in which signal quality meets the preset condition.

S430. The first terminal displays indication information that is used to instruct a user to move to the target position.

In the method for position guidance based on radio signal quality according to this embodiment of the present disclosure, a terminal actively determines that signal quality in a position in which the terminal is currently located does not meet a preset condition, then acquires a target position in which signal quality meets the preset condition, and instructs a user to move to the target position to obtain signal quality that meets the preset condition. Compared with some approaches in which a network device determines whether signal quality in a current position of a terminal meets a preset condition, in the method for position guidance based on radio signal quality according to this embodiment of the present disclosure, signal quality in the position in which the terminal is located can be discovered in time, and if signal quality in the position in which the terminal is located does not meet the preset condition, the user is guided in time to move to a position in which signal quality meets the preset condition.

Therefore, in the method for position guidance based on radio signal quality according to this embodiment of the present disclosure, a terminal actively determines whether signal quality in a position in which the terminal is currently located meets a preset condition, which can effectively improve timeliness of guiding a user to move to a target position of better signal quality.

Specifically, in step S410, the first terminal detects in real time signal quality in the position in which the first terminal is located, and monitors in real time whether signal quality in the current position meets the preset condition.

The signal quality in the position in which the first terminal is currently located refers to channel quality of an associated link between the position in which the first terminal is currently located and a serving base station of a cell in which the first terminal is located. Specifically, the first terminal may periodically detect, by using a CQI mechanism, the signal quality in the position in which the first terminal is currently located. It should be understood that the CQI is a criterion for measuring communication quality of a radio channel, and may be obtained through calculation according to the following channel performance indicators: a SNR, a SINR, or a SNDR, or other channel quality performance indicators.

The foregoing preset condition may be understood as a signal quality threshold. Specifically, the preset condition may be any one of the following indicators or a combination of multiple indicators: The preset condition may specifically be a threshold set for a channel quality performance indicator, for example, a threshold set for the SNR, the SINR, or the SNDR, or other channel quality performance indicators.

The preset condition is not necessarily a threshold of a specific channel quality performance indicator, and may also be an evaluation system for multiple parameters. For example, the preset condition indicates a first threshold that the SNR needs to reach, a second threshold that the SINR needs to reach, and a third threshold that the SNDR needs to reach. That is, the preset condition is an evaluation system for measuring signal quality. It should also be understood that the preset condition may be configured by the user at discretion; or may be configured specifically according to a requirement, on signal quality, of a type of a service currently performed by the first terminal; or may be configured according to an importance level of the user, where a higher user level indicates a higher requirement of the preset condition.

Optionally, the first terminal does not need to always detect signal quality in the position in which the first terminal is currently located, and may trigger an action of signal quality detection in real time when perceiving that the terminal is performing a call service or that there will be an incoming call or that dialing will be performed to make an outgoing call.

In step S420, when it is determined, by using the determining action in step S410, that signal quality in the first position (the position in which the terminal is currently located) does not meet the preset condition, the target position in which signal quality meets the preset condition is acquired. Specifically, the method for acquiring the target position in which signal quality meets the preset condition may include the following two methods. In the first method, the target position is determined by acquiring position information and signal quality of other terminals nearby; in the second method, the target position is recommended by requesting a network device.

Optionally, in this embodiment of the present disclosure, that the first terminal acquires a target position in which signal quality meets the preset condition in step S420 includes the following steps not shown in FIG. 4.

S421. The first terminal acquires signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold.

S422. The first terminal determines at least one candidate position according to the signal quality in the positions in which the at least two second terminals are respectively located, where the at least one candidate position includes a position in which signal quality meets the preset condition in the positions in which the at least two second terminals are respectively located.

S423. The first terminal determines the target position in the at least one candidate position.

Specifically, in step S421, a request may be sent to at least two second terminals around the first position, where the request is used to request to report signal quality in positions of the at least two second terminals; signal quality reported by the at least two second terminals is received; and then signal quality in the positions in which the at least two second terminals are respectively located is acquired. The preset threshold may be set by the user, or may be preset by a system, which is not limited by this embodiment of the present disclosure.

It should be understood that positioning information of the positions in which the at least two second terminals are located may be directly requested from the at least two second terminals, or may by requested from a location server, which is not limited by this embodiment of the present disclosure.

It should also be understood that in this embodiment of the present disclosure, each second terminal included in the at least two second terminals is not necessarily a terminal that belongs to a same serving base station as the first terminal, which is not limited by this embodiment of the present disclosure, as long as a distance from a position in which the second terminal is currently located to the first terminal is less than the preset threshold.

In step S422, all positions in which signal quality meets the preset condition are screened out from position information of the at least two terminals.

In step S423, if the at least one candidate position includes only one position, the at least one candidate position is determined as the target position. If the at least one candidate position includes two or more than two positions, the target position may be determined from the positions according to a specific screening principle.

Optionally, in this embodiment of the present disclosure, the first terminal determines the target position in the at least one candidate position in step S423 includes one of the following steps not shown in FIG. 4.

S423A. The first terminal determines a position of best signal quality in the at least one candidate position, as the target position.

S423B. The first terminal determines a position that is closest to the first position and in the at least one candidate position, as the target position.

S423C. The first terminal determines the target position according to a user instruction by displaying the at least one candidate position to the user.

Specifically, position information of the at least one candidate position is displayed to the user, so that the user may be instructed to select an ideal position, and then the position determined by the user is used as the target position.

Further, a third threshold whose distance is less than the preset threshold may be set. Positions whose distances from the first position are less than or equal to the third threshold are selected from a candidate position set, and then a position of best signal quality is selected, from these positions, as the target position.

It should be understood that in the method for position guidance based on radio signal quality according to this embodiment of the present disclosure, a terminal actively determines a target position, and can determine a more preferred target position in a case of fully considering features of the terminal, for example, determine, based on factors such as software and hardware performance conditions of the terminal, a surrounding geographic environment of a position in which the terminal is currently located, or user preference information, a target position in which signal quality meets a requirement, so that an indication icon used to point to the target position is displayed on a status bar to guide a user to move to the target position, and a problem of guiding the user to move from a position of poor signal quality to a target position of better signal quality can be resolved effectively.

In addition to the method for acquiring a target position in step S421 to step S423, the target position may be acquired by using the method for requesting the network device to recommend the target position.

Optionally, in this embodiment of the present disclosure, that the first terminal acquires a target position in which signal quality meets the preset condition in step S420 includes the following steps not shown in FIG. 4.

S424. The first terminal sends, to a network device, a request message that is used to request to recommend a position in which signal quality meets the preset condition.

S425. The first terminal receives at least one recommended position that is sent by the network device according to the request message, where signal quality in the at least one recommended position meets the preset condition.

S426. The first terminal determines the target position according to the at least one recommended position.

Specifically, as shown in FIG. 5, in step S51, a terminal A detects signal quality in a position in which the terminal A is currently located, and determines whether the detected signal quality meets a preset condition; in step S52, the terminal A determines that the detected signal quality does not meet the preset condition; in step S53, the terminal A sends, to a network device, a request message that is used to request to recommend a target position in which signal quality meets the preset condition; in step S54, the network device screens out, according to and from position information and signal quality information of another terminal B in a surrounding area of the terminal A, a position B that is relatively close to the terminal A and in which signal quality meets the preset condition, and uses the position B as the target position; in step S55, the network device sends, according to the request message in step S53, a response message including the target position to the terminal A; in step S56, the terminal A determines the target position according to the response message, and guides a user and displays the target position while considering the position in which the terminal A is currently located, so that the user obtains better signal quality.

In step S51, when it is detected that the terminal A is performing a call service or it is predicated that the terminal A will perform dialing or will receive an incoming call, whether signal quality in the position in which the terminal A is currently located meets the preset condition (which may be understood as a signal quality threshold for the call) may be detected and monitored.

In step S54, the network device determines, according to a received position guiding request and based on collected position information and signal quality information of other terminals in the surrounding area of the terminal A, a target position in which signal quality can meet the preset condition. Specifically, a position of best signal quality in all positions that meet the preset threshold in a cell may be determined as the target position; or a position that is closest to the first position and in all positions that meet the preset threshold in a cell may be determined as the target position.

The network device may determine the target position based on the beforehand collected position information and signal quality information of the other terminals in the surrounding area of the terminal A; or the other terminals in the surrounding area of the terminal A may be requested in real time to report position information and signal quality information of positions of the other terminals. Optionally, each terminal may be directly requested to report respective position information, or position information of each terminal may be requested from a location server.

It should be understood that the network device in this embodiment of the present disclosure may be a base station, or may be a server, or may be a combination of a base station and a server. If the network device is a base station of a serving cell in which the terminal A is located, the base station may request each terminal in the serving cell to report, in real time, signal quality information of a position in which each terminal is located; or may acquire, from a neighboring base station, signal quality information of a position in which a terminal in a cell covered by the neighboring base station is located, which is not limited by this embodiment of the present disclosure.

Optionally, in this embodiment of the present disclosure, there may be multiple methods for acquiring position information of the terminal by the network device, for example, may be receiving position information reported by the terminal at discretion, or receiving position information of the terminal reported by means of assistance of other access devices, where the reporting is, for example, reporting assisted by accessed WiFi, or reporting assisted by an access femtocell, or may be global positioning satellite (GPS), or assisted GPS (A-GPS), positioning assisted by multiple base stations, WiFi positioning, or positioning with reference to a map.

In step S55, the network device delivers a response message including the target position to the terminal A. Optionally, the response message indicates only one position in which signal quality meets the preset threshold. Optionally, the response message may further indicate a candidate position set including at least two positions in which signal quality meets the preset threshold, that is, the candidate position set may be positions that are in a range of cells covered by a base station and in which signal quality meets the preset condition.

The position information delivered by the network device to the terminal A may be absolute position information, such as latitude and longitude and height, or may be relative position information, such as a direction and an angle relative to the current position of the terminal A, which is not limited by this embodiment of the present disclosure.

In step S56, if the response message received by the terminal A includes at least two positions in which signal quality meets the preset condition, the terminal A first determines the target position from the two positions, and specifically, the terminal A may use any method in step S423A to step S423C or any other one screening principle to determine the target position. Finally, the terminal A displays the target position to the user and guides the user.

In step S430, the first terminal displays the indication information that is used to instruct the user to move to the target position, and specifically, provides guidance and displayation of the target position to the user. A manner of the guidance and displayation may support an approximate indication. Specifically, for example, an arrow icon 215 is displayed on a status bar 210 on a user interface 200 shown in FIG. 2A to instruct the user to move to the target position. Further, real-time navigation may further be provided with reference to map information to guide the user, or voice navigation and displayation may be provided.

Optionally, in this embodiment of the present disclosure, a form of the indication information is any one or more of the following manners: an icon, a text, a voice, and a map.

Optionally, in this embodiment of the present disclosure, a user interface of the first terminal includes a status bar and a user operation area.

That the first terminal displays indication information that is used to instruct a user to move to the target position in step S430 includes the following step.

S431. Display an indication icon on the status bar on the user interface of the first terminal, where the indication icon is used to instruct the user to move to the target position.

Specifically, as shown in FIG. 2A, the indication icon may be the arrow icon 215, and a direction of the arrow points to the target position in real time.

Optionally, in this embodiment of the present disclosure, the indication icon is an arrow icon, and the method further includes: adjusting a direction of an arrow in the indication icon in real time in a movement process of the first terminal, so that the arrow always points to the target position.

As shown in FIG. 2A, optionally, in this embodiment of the present disclosure, an indication icon 212 used to indicate remaining power of the first terminal and/or an indication icon 211 used to indicate clock information is further displayed on the status bar.

Adding, deleting, or modifying any one or more indication icons on the status bar does not affect a displayation effect of a task that is performed by the terminal currently in the user operation area. Therefore, in this embodiment of the present disclosure, the indication icon is displayed on the status bar to instruct the user to move to the target position in which signal quality meets the preset condition, on one hand, the user may be reminded in time to move to the target position to acquire better signal quality; on the other hand, impact on the current operation task of the user on the terminal is avoided, and user experience can be improved effectively.

It should be understood that in this embodiment of the present disclosure, regardless of a spatial placement position in which the terminal is located, the user may view the status bar conveniently, and may further view the indication icon that is used to instruct the user to arrive at the target position, and therefore may move to the target position of better signal quality in time.

Therefore, in this embodiment of the present disclosure, the indication icon that is used to guide the user to arrive at the target position is displayed on the status bar of the user interface of the terminal, which ensures that the user may conveniently view the indication icon no matter what task the terminal is currently performing and therefore may move to the target position of better signal quality in time. That is, the method for position guidance based on radio signal quality according to this embodiment of the present disclosure does not affect the operation task currently performed by the user by using the terminal, when the indication icon is used to guide the user to arrive at the target position, and therefore, user experience can be improved effectively.

When the indication icon used to instruct the user to move to the target position is displayed on the status bar, a guiding path may be further displayed to the user with reference to map information.

Optionally, in this embodiment of the present disclosure, that the first terminal displays indication information that is used to instruct a user to move to the target position in step S430 further includes the following steps.

S432. Determine a guiding path from the first position to the target position.

S433. Display, in the user operation area, map information marked with the guiding path, to instruct the user to move from the first position to the target position.

Optionally, in this embodiment of the present disclosure, the determining a guiding path from the first position to the target position in step S432 includes: determining the guiding path according to prestored measurement data of signal quality in a surrounding area of the first position, where the surrounding area of the first position includes the target position.

Steps S432 and S433 correspond to steps S330 and S340 described in the foregoing. For brevity, details are not further described herein.

When it is determined that the user moves to the target position and that signal quality in the target position meets the preset condition indeed, the user may be reminded to stop moving.

Optionally, in this embodiment of the present disclosure, the method 400 further includes: when it is determined that signal quality in a second position in which the first terminal is located meets the preset condition before the first terminal arrives at the target position, hiding the indication icon, or changing the indication icon from a directional state to a nondirectional state.

Specifically, as shown in FIG. 2A and FIG. 2B, an indication icon 215 includes two statuses, an arrow icon (for example, the icon 215 shown in FIG. 2A) and a circle icon (for example, an icon 215 shown in FIG. 2B), and the status of the arrow icon may be displayed in a process of guiding the user to arrive at the target position; when it is determined that the first terminal arrives at the target position and it is detected that signal quality in the target position meets the preset condition indeed, the indication icon may be changed to the status of the circle icon, to remind the user that signal quality in the current position may meet the preset condition and that the user may stop moving.

Further, in this embodiment of the present disclosure, in the process in which the first terminal moves towards the target position, signal quality in the position in which the first terminal is currently located is detected in real time, and whether signal quality in the position in which the first terminal is currently located meets the preset condition is monitored in real time. If it is detected that signal quality in the second position in which the first terminal is currently located meets the preset condition before the first terminal arrives at the target position, a related indication may be displayed to the user, to remind the user that signal quality in the current position of the user meets the preset condition and that the user may stop moving.

Optionally, in this embodiment of the present disclosure, the method 400 further includes, when it is determined that the first terminal arrives at the target position and that signal quality in the target position meets the preset condition, hiding the indication icon, or changing the indication icon from a directional state to a nondirectional state.

Specifically, in the process in which the first terminal moves towards the target position, before a position in which signal quality meets the preset condition is detected, the indication icon on the status bar displays a directional state and points to the target position in real time. When it is detected that signal quality in the second position in the path meets the preset threshold, the status of the indication icon on the status bar is changed to a nondirectional state, for example, a circle or a solid circle; or the indication icon on the status bar is hidden. In this way, the user is reminded that signal quality in the current position of the user can meet a requirement of the preset condition, and that the user may stop moving.

Therefore, in this embodiment of the present disclosure, whether signal quality in a position in which a terminal is located meets a preset condition is monitored in real time, so that signal quality in the current position can be learned in time; a corresponding indication icon is displayed on a status bar, so that a user can be guided effectively in time to move to a position of better signal quality, and the user can also be reminded in time to stop moving when signal quality meets the preset condition.

Further, after it is detected that the first terminal moves to the position in which signal quality meets the preset condition, text information may further be displayed to the user or voice information may further be played for the user, to remind the user to stop moving.

Therefore, in the method for position guidance based on radio signal quality according to this embodiment of the present disclosure, an indication icon is displayed on a status bar, a user is reminded of signal quality in a position in which the user is currently located, and if the signal quality in the position in which the user is currently located is poor, the user may be guided to arrive at a target position of better signal quality. Therefore, on a premise that a current operation of the terminal is not affected, the user can be effectively guided to move to a position of better signal quality, and user experience can be improved effectively.

Optionally, because signal quality is time-varying, a case in which signal quality in the target position does not meet the preset condition may occur after the user arrives at the target position. In this case, related actions of steps S410, S420, and S430 may be performed again, finally guiding the user to arrive at a position in which signal quality meets the preset condition.

Specifically, after the target position is reached, when it is discovered that signal quality in the target position does not meet the requirement of the preset condition, a target position may be acquired again by means of actively requesting a terminal nearby to report signal quality in the position in which the terminal is located or requesting the network device to recommend a target position; or a position may be reselected from the at least one candidate position acquired in step S422 or from the at least one recommended position delivered by the network device and acquired in step S425, and used as a new target position.

In the method for position guidance based on radio signal quality according to this embodiment of the present disclosure, a terminal actively determines that signal quality in a position in which the terminal is currently located does not meet a preset condition, then acquires a target position in which signal quality meets the preset condition, and instructs a user to move to the target position to obtain signal quality that meets the preset condition. Compared with some approaches in which a network device determines whether signal quality in a current position of a terminal meets a preset condition, in the method for position guidance based on radio signal quality according to this embodiment of the present disclosure, it can be discovered in time that signal quality in the position in which the terminal is located does not meet the preset condition, and therefore, efficiency of guiding the user to move to a position in which signal quality meets a preset condition can be improved effectively.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The methods for position guidance based on radio signal quality according to the embodiments of the present disclosure are described in detail above with reference to FIG. 1 to FIG. 5. The following describes in detail apparatuses for position guidance based on radio signal quality according to the embodiments of the present disclosure with reference to FIG. 6 to FIG. 11.

Figure 6:
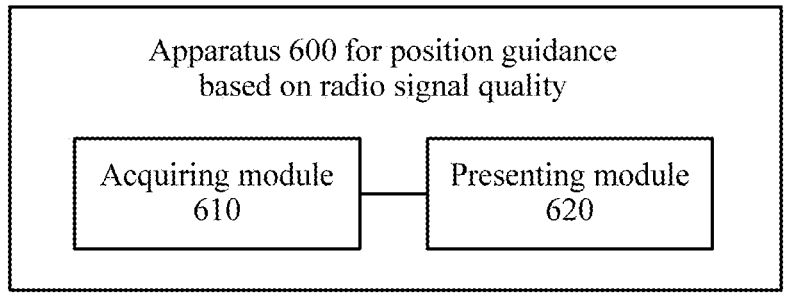
FIG. 6 is a schematic block diagram of an apparatus for position guidance based on radio signal quality according to an embodiment of the present disclosure.
Figure 7:
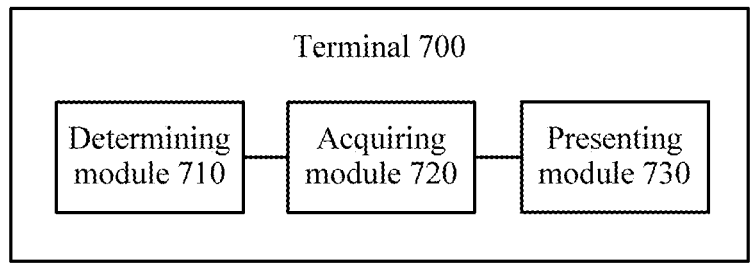
FIG. 7 is a schematic block diagram of a terminal according to another embodiment of the present disclosure.

FIG. 6 shows a schematic block diagram of an apparatus 600 for position guidance based on radio signal quality according to an embodiment of the present disclosure. As shown in FIG. 6, the apparatus 600 includes an acquiring module 610 configured to, when it is determined that signal quality in a first position does not meet a preset condition, acquire a target position in which signal quality meets the preset condition, where the first position is a position in which a first terminal is currently located; and a presenting module 620 configured to display an indication icon on a status bar of a user interface of the first terminal, where the indication icon is used to instruct a user to move to the target position acquired by the acquiring module 610, and the user interface includes the status bar and a user operation area.

Therefore, according to the apparatus for position guidance based on radio signal quality according to this embodiment of the present disclosure, an indication icon is displayed on a status bar, where the indication icon is used to guide a user to move from a position in which the user is currently located and in which signal quality does not meet a preset condition to a target position in which signal quality meets the preset condition. Therefore, on a premise that a current operation task of the user is not affected, the user can be effectively guided to move to a position of better signal quality, and user experience can be improved effectively.

Optionally, as an embodiment, the indication icon displayed by the presenting module 620 is an arrow icon, and the apparatus further includes an adjusting module (not pictured) configured to adjust a direction of an arrow in the indication icon in real time in a movement process of the first terminal, so that the arrow always points to the target position.

Optionally, as an embodiment, the apparatus 600 further includes a determining module (not pictured) configured to determine a guiding path from the first position to the target position, where the presenting module 620 is further configured to display, in the user operation area, map information marked with the guiding path determined by the determining module.

Optionally, as an embodiment, the determining module 640 is configured to determine the guiding path according to prestored measurement data of signal quality in a surrounding area of the first position, where the surrounding area of the first position includes the target position.

Optionally, as an embodiment, the presenting module 620 is further configured to, when it is determined that signal quality in a second position in which the first terminal is located meets the preset condition before the first terminal arrives at the target position, hide the indication icon, or change the indication icon from a directional state to a nondirectional state.

Optionally, as an embodiment, the presenting module 620 is further configured to, when it is determined that the first terminal arrives at the target position and that signal quality in the target position meets the preset condition, hide the indication icon, or change the indication icon from a directional state to a nondirectional state.

Optionally, as an embodiment, the acquiring module 610 includes an acquiring unit (not pictured) configured to acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; a first determining unit (not pictured) configured to determine at least one candidate position according to the signal quality in the positions in which the at least two second terminals are respectively located that is acquired by the acquiring unit, where the at least one candidate position includes a position in which signal quality meets the preset condition in the positions in which the at least two second terminals are respectively located; and a second determining unit (not pictured) configured to determine the target position in the at least one candidate position determined by the first determining unit.

Optionally, as an embodiment, the second determining unit 613 is configured to determine a position of best signal quality in the at least one candidate position, as the target position; or the second determining unit 613 is configured to determine a position that is closest to the first position and in the at least one candidate position, as the target position; or the second determining unit 613 is configured to determine the target position according to a user instruction by displaying the at least one candidate position to the user.

Optionally, as an embodiment, the apparatus 600 is the first terminal, where the acquiring module 610 includes a sending unit (not pictured) configured to send, to a network device, a request message that is used to request to recommend a position in which signal quality meets the preset condition; a receiving unit (not pictured) configured to receive at least one recommended position that is sent by the network device according to the request message, where signal quality in the at least one recommended position meets the preset condition; and a third determining unit (not pictured) configured to determine the target position according to the at least one recommended position received by the receiving unit.

It should be understood that, the apparatus 600 for position guidance based on radio signal quality according to this embodiment of the present disclosure may correspond to the first terminal or the network device in the method for position guidance based on radio signal quality in the embodiment of the present disclosure, and the foregoing and other operations and/or functions of each module in the apparatus 600 are respectively intended to implement a corresponding procedure of each method in FIG. 3 to FIG. 5. For brevity, details are not further described herein.

Therefore, according to the apparatus for position guidance based on radio signal quality according to this embodiment of the present disclosure, an indication icon is displayed on a status bar, where the indication icon is used to guide a user to move from a position in which the user is currently located and in which signal quality does not meet a preset condition to a target position in which signal quality meets the preset condition. Therefore, on a premise that a current operation task of the user is not affected, the user can be effectively guided to move to a position of better signal quality, and user experience can be improved effectively.

The apparatus 600 for position guidance based on radio signal quality according to the embodiment of the present disclosure is described above with reference to FIG. 6. The following describes in detail a terminal 700 provided by an embodiment of the present disclosure, where the terminal 700 includes a determining module 710 configured to determine whether signal quality in a first position meets a preset condition, where the first position is a position in which the terminal is currently located; an acquiring module 720 configured to, when the determining module 710 determines that the signal quality in the first position does not meet the preset condition, acquire a target position in which signal quality meets the preset condition; and a presenting module 730 configured to display indication information that is used to instruct a user to move to the target position acquired by the acquiring module.

Therefore, according to the terminal provided by this embodiment of the present disclosure, the terminal actively determines that signal quality in a position in which the terminal is currently located does not meet a preset condition, then acquires a target position in which signal quality meets the preset condition, and instructs a user to move to the target position to obtain signal quality that meets the preset condition. Compared with some approaches in which a network device determines whether signal quality in a current position of a terminal meets a preset condition, according to the method for position guidance based on radio signal quality according to the embodiment of the present disclosure, it can be discovered in time that signal quality in the position in which the terminal is located does not meet the preset condition, and therefore, efficiency of guiding the user to move to a position in which signal quality meets a preset position can be improved effectively.

Optionally, as an embodiment, the acquiring module 720 includes an acquiring unit (not pictured) configured to acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; a first determining unit (not pictured) configured to determine at least one candidate position according to the signal quality in the positions in which the at least two second terminals are respectively located that is acquired by the acquiring unit, where the at least one candidate position includes a position in which signal quality meets the preset condition in the positions in which the at least two second terminals are respectively located; and a second determining unit (not pictured) configured to determine the target position in the at least one candidate position determined by the first determining unit.

Optionally, as an embodiment, the second determining unit is configured to determine a position of best signal quality in the at least one candidate position, as the target position; or the second determining unit is specifically configured to determine a position that is closest to the first position and in the at least one candidate position, as the target position; or the second determining unit is specifically configured to determine the target position according to a user instruction by displaying the at least one candidate position to the user.

Optionally, as an embodiment, the acquiring module 720 includes a sending unit (not pictured) configured to send, to a network device, a request message that is used to request to recommend a position in which signal quality meets the preset condition; a receiving unit (not pictured) configured to receive at least one recommended position that is sent by the network device according to the request message, where signal quality in the at least one recommended position meets the preset condition; and a third determining unit (not pictured) configured to determine the target position according to the at least one recommended position received by the receiving unit.

Optionally, as an embodiment, a form of the indication information displayed by the presenting module 730 is any one of the following manners or a combination of multiple manners: an icon, a text, a voice, and a map.

It should be understood that, the terminal 700 according to this embodiment of the present disclosure may correspond to the first terminal in the method for position guidance based on radio signal quality in the embodiment of the present disclosure, and the foregoing and other operations and/or functions of each module in the terminal 700 are respectively intended to implement a corresponding procedure of each method in FIG. 3 to FIG. 5. For brevity, details are not further described herein.

Therefore, according to the terminal provided by this embodiment of the present disclosure, the terminal actively determines that signal quality in a position in which the terminal is currently located does not meet a preset condition, then acquires a target position in which signal quality meets the preset condition, and instructs a user to move to the target position to obtain signal quality that meets the preset condition. Compared with some approaches in which a network device determines whether signal quality in a current position of a terminal meets a preset condition, according to the method for position guidance based on radio signal quality according to the embodiment of the present disclosure, it can be discovered in time that signal quality in the position in which the terminal is located does not meet the preset condition, and therefore, efficiency of guiding the user to move to a position in which signal quality meets a preset position can be improved effectively.

Figure 8:
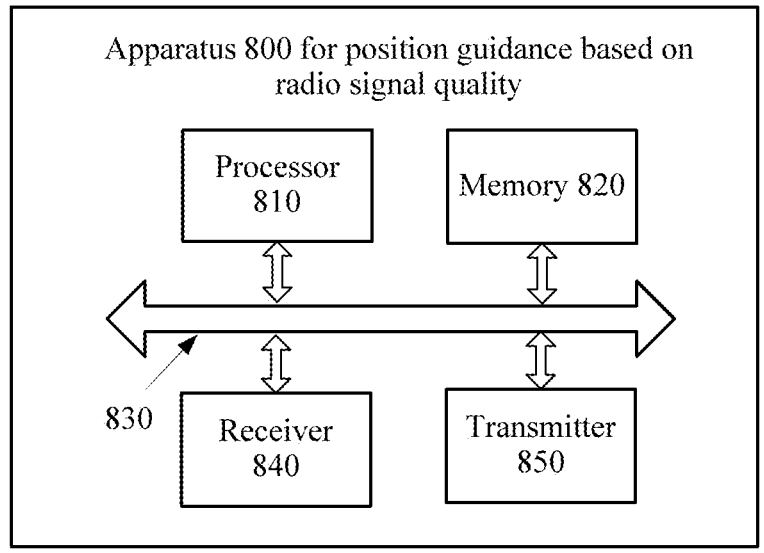
FIG. 8 is a schematic block diagram of an apparatus for position guidance based on radio signal quality according to another embodiment of the present disclosure.

As shown in FIG. 8, an embodiment of the present disclosure further provides an apparatus 800 for position guidance based on radio signal quality, where the apparatus 800 includes a processor 810, a memory 820, a bus system 830, a receiver 840, and a transmitter 850. The processor 810, the memory 820, the receiver 840, and the transmitter 850 are connected by using the bus system 830. The memory 820 is configured to store an instruction, and the processor 810 is configured to execute the instruction stored by the memory 820, to control the receiver 840 to receive a signal and control the transmitter 850 to send a signal. The processor 810 is configured to, when it is determined that signal quality in a first position does not meet a preset condition, acquire a target position in which signal quality meets the preset condition, where the first position is a position in which a first terminal is currently located; and display an indication icon on a status bar of a user interface of the first terminal, where the indication icon is used to instruct a user to move to the target position, and the user interface includes the status bar and a user operation area.

Therefore, according to the apparatus for position guidance based on radio signal quality according to this embodiment of the present disclosure, an indication icon is displayed on a status bar, where the indication icon is used to guide a user to move from a position in which the user is currently located and in which signal quality does not meet a preset condition to a target position in which signal quality meets the preset condition. Therefore, on a premise that a current operation task of the user is not affected, the user can be effectively guided to move to a position of better signal quality, and user experience can be improved effectively.

Optionally, as an embodiment, the indication icon is an arrow icon, and the processor 810 is configured to adjust a direction of an arrow in the indication icon in real time in a movement process of the first terminal, so that the arrow always points to the target position.

Optionally, as an embodiment, the processor 810 is configured to determine a guiding path from the first position to the target position; and display, in the user operation area, map information marked with the guiding path.

Optionally, as an embodiment, the processor 810 is configured to determine the guiding path according to prestored measurement data of signal quality in a surrounding area of the first position, where the surrounding area of the first position includes the target position.

Optionally, as an embodiment, the processor 810 is configured to: when it is determined that signal quality in a second position in which the first terminal is located meets the preset condition before the first terminal arrives at the target position, hide the indication icon, or change the indication icon from a directional state to a nondirectional state.

Optionally, as an embodiment, the processor 810 is configured to: when it is determined that the first terminal arrives at the target position and that signal quality in the target position meets the preset condition, hide the indication icon, or change the indication icon from a directional state to a nondirectional state.

Optionally, as an embodiment, the processor 810 is configured to: acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; determine at least one candidate position according to the signal quality in the positions in which the at least two second terminals are respectively located, where the at least one candidate position includes a position in which signal quality meets the preset condition in the positions in which the at least two second terminals are respectively located; and determine the target position in the at least one candidate position.

Optionally, as an embodiment, the processor 810 is configured to determine a position of best signal quality in the at least one candidate position, as the target position; or determine a position that is closest to the first position and in the at least one candidate position, as the target position; or determine the target position according to a user instruction by displaying the at least one candidate position to the user.

Optionally, as an embodiment, the apparatus 800 is the first terminal; the transmitter 850 is configured to send, to a network device, a request message that is used to request to recommend a position in which signal quality meets the preset condition; the receiver 840 is configured to receive at least one recommended position that is sent by the network device according to the request message, where signal quality in the at least one recommended position meets the preset condition; and the processor 810 is configured to determine the target position according to the at least one recommended position.

It should be understood that in this embodiment of the present disclosure, the processor 810 may be a central processing unit (CPU), or the processor 810 may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor or the processor may be any conventional processor or the like.

The memory 820 may include a read-only memory and a random access memory, and provide the instruction and data to the processor 810. A part of the memory 820 may further include a non-volatile random access memory. For example, the memory 820 may further store information about a device type.

The bus system 830 may further include a power bus, a control bus, a status signal bus, and the like, in addition to a data bus. However, for clear description, various buses in the figure are marked as the bus system 830.

In an implementation process, each step of the foregoing method may be completed by using an integrated logic circuit of hardware in the processor 810 or an instruction in a form of software. Steps of the method disclosed with reference to the embodiment of the present disclosure may be directly implemented by a hardware processor, or may be implemented by a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 820, and the processor 810 reads information in the memory 820 and completes the steps in the foregoing method in combination with hardware of the processor. To avoid repetition, details are not described herein again.

Optionally, as an embodiment, that the processor 810 determines information about a measurement capability of user equipment includes: determining a measurement time for the user equipment for measuring a specified neighboring cell completely; and determining the information about the measurement capability of the user equipment according to the measurement time.

It should be understood that, the apparatus 800 for position guidance based on radio signal quality according to this embodiment of the present disclosure may correspond to the first terminal or the network device in the method for position guidance based on radio signal quality in the embodiment of the present disclosure, or may correspond to the apparatus 600 for position guidance based on radio signal quality according to the embodiment of the present disclosure, and the foregoing and other operations and/or functions of each module in the apparatus 800 are respectively intended to implement a corresponding procedure of each method in FIG. 3 to FIG. 5. For brevity, details are not further described herein.

Therefore, according to the apparatus for position guidance based on radio signal quality according to this embodiment of the present disclosure, an indication icon is displayed on a status bar, where the indication icon is used to guide a user to move from a position in which the user is currently located and in which signal quality does not meet a preset condition to a target position in which signal quality meets the preset condition. Therefore, on a premise that a current operation task of the user is not affected, the user can be effectively guided to move to a position of better signal quality, and user experience can be improved effectively.

Figure 9:
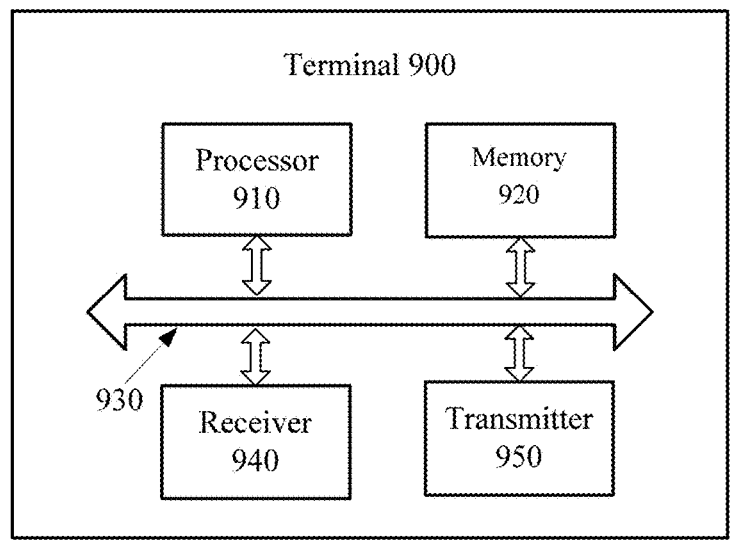
FIG. 9 is a schematic block diagram of a terminal according to still another embodiment of the present disclosure.

As shown in FIG. 9, an embodiment of the present disclosure further provides a terminal 900, where the terminal 900 includes a processor 910, a memory 920, a bus system 930, a receiver 940, and a transmitter 950. The processor 910, the memory 920, the receiver 940, and the transmitter 950 are connected by using the bus system 930. The memory 920 is configured to store an instruction, and the processor 910 is configured to execute the instruction stored by the memory 920 to control the receiver 940 to receive a signal and control the transmitter 950 to send a signal. The processor 910 is configured to determine whether signal quality in a first position meets a preset condition, where the first position is a position in which the terminal is currently located; when it is determined that the signal quality in the first position does not meet the preset condition, acquire a target position in which signal quality meets the preset condition; and display indication information that is used to instruct a user to move to the target position.

Therefore, according to the terminal provided by this embodiment of the present disclosure, the terminal actively determines that signal quality in a position in which the terminal is currently located does not meet a preset condition, then acquires a target position in which signal quality meets the preset condition, and instructs a user to move to the target position to obtain signal quality that meets the preset condition. Compared with some approaches in which a network device determines whether signal quality in a current position of a terminal meets a preset condition, according to the method for position guidance based on radio signal quality according to this embodiment of the present disclosure, it can be discovered in time that signal quality in the position in which the terminal is located does not meet the preset condition, and therefore, efficiency of guiding the user to move to a position in which signal quality meets a preset position can be improved effectively.

Optionally, as an embodiment, the processor 910 is configured to acquire signal quality in positions in which at least two second terminals are respectively located, where the positions in which the at least two second terminals are respectively located include at least one position in which signal quality meets the preset condition, and distances from the positions in which the at least two second terminals are respectively located to the first position are both less than a preset threshold; determine at least one candidate position according to the signal quality in the positions in which the at least two second terminals are respectively located, where the at least one candidate position includes a position in which signal quality meets the preset condition in the positions in which the at least two second terminals are respectively located; and determine the target position in the at least one candidate position.

Optionally, as an embodiment, the processor 910 is configured to determine a position of best signal quality in the at least one candidate position, as the target position; or determine a position that is closest to the first position and in the at least one candidate position, as the target position; or determine the target position according to a user instruction by displaying the at least one candidate position to the user.

Optionally, as an embodiment, the transmitter 950 is configured to send, to a network device, a request message that is used to request to recommend a position in which signal quality meets the preset condition; the receiver 940 is configured to receive at least one recommended position that is sent by the network device according to the request message, where signal quality in the at least one recommended position meets the preset condition; and the processor 910 is configured to determine the target position according to the at least one recommended position.

Optionally, as an embodiment, a form of the indication information is any one or more of the following manners: an icon, a text, a voice, and a map.

It should be understood that in this embodiment of the present disclosure, the processor 910 may be CPU, or the processor 910 may be another general purpose processor, a DSP, an ASIC, a FPGA, or another programmable logic device, a discrete gate or a transistor logic device, a discrete hardware component, or the like. The general purpose processor may be a microprocessor or the processor may be any conventional processor or the like.

The memory 920 may include a read-only memory and a random access memory, and provide the instruction and data to the processor 910. A part of the memory 920 may further include a non-volatile random access memory. For example, the memory 920 may further store information about a device type.

The bus system 930 may further include a power bus, a control bus, a status signal bus, and the like, in addition to a data bus. However, for clear description, various buses in the figure are marked as the bus system 930.

In an implementation process, each step of the foregoing method may be completed by using an integrated logic circuit of hardware in the processor 910 or an instruction in a form of software. Steps of the method disclosed with reference to the embodiment of the present disclosure may be directly implemented by a hardware processor, or may be implemented by a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 920, and the processor 910 reads information in the memory 920 and completes the steps in the foregoing method in combination with hardware of the processor. To avoid repetition, details are not described herein again.

It should be understood that, the terminal 900 according to this embodiment of the present disclosure may correspond to the first terminal in the method for position guidance based on radio signal quality in the embodiment of the present disclosure, or may correspond to the terminal 700 according to the embodiment of the present disclosure, and the foregoing and other operations and/or functions of each module in the terminal 900 are respectively intended to implement a corresponding procedure of each method in FIG. 3 to FIG. 5. For brevity, details are not further described herein.

Therefore, according to the terminal provided by this embodiment of the present disclosure, the terminal actively determines that signal quality in a position in which the terminal is currently located does not meet a preset condition, then acquires a target position in which signal quality meets the preset condition, and instructs a user to move to the target position to obtain signal quality that meets the preset condition. Compared with some approaches in which a network device determines whether signal quality in a current position of a terminal meets a preset condition, according to the method for position guidance based on radio signal quality according to the embodiment of the present disclosure, it can be discovered in time that signal quality in the position in which the terminal is located does not meet the preset condition, and therefore, efficiency of guiding the user to move to a position in which signal quality meets a preset position can be improved effectively.

Figure 10:
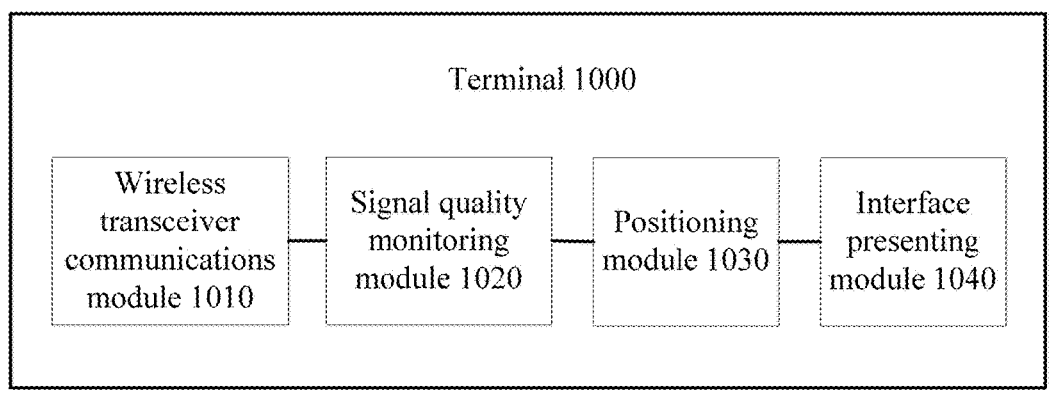
FIG. 10 is a schematic block diagram of a terminal according to yet another embodiment of the present disclosure.

FIG. 10 shows a schematic block diagram of a terminal 1000 according to an embodiment of the present disclosure. As shown in FIG. 10, the terminal 1000 includes a wireless transceiver communications module 1010, a signal quality monitoring module 1020, a positioning module 1030, and an interface presenting module 1040.

The wireless transceiver communications module 1010 is configured to perform communication with a base station, and can access a service, for example, report channel quality information, report position information, request to obtain a recommendation of a position of better signal quality, and the like.

The signal quality monitoring module 1020 is configured to monitor signal quality, and when signal quality is lower than a threshold, request to obtain a recommendation of a position of better signal quality from a network side.

Optionally, the signal quality monitoring module 1020 is specifically configured to, when a user is preparing for or performing a service that has a relatively high requirement on user experience such as a call or network access, reinforce signal quality monitoring to request, when it is found that signal quality is poor, the network side to recommend a position of better signal quality.

The positioning module 1030 is configured to acquire positioning information of a terminal. Specifically, the positioning information of the terminal may be acquired by using methods such as GPS, A-GPS, WiFi, and BLUETOOTH. Optionally, the positioning module 1030 may further request positioning information of the terminal from a network device.

The interface presenting module 1040 is configured to display, on a status bar of a user interface, an indication icon (such as an icon 115 in FIG. 2) that is used to indicate a direction of a position of better signal quality. Optionally, the interface presenting module 1040 is further configured to perform navigation for the user in a manner of a voice or a map or the like, to guide the user to move towards the direction of the position of better signal quality.

Optionally, the terminal 1000 shown in FIG. 10 is a smartphone.

It should be understood that, the terminal 1000 according to this embodiment of the present disclosure may correspond to the first terminal in the method for position guidance based on radio signal quality in the embodiment of the present disclosure, or the terminal 1000 may correspond to the terminal 700 and the terminal 900 according to the embodiments of the present disclosure, and the foregoing and other operations and/or functions of each module in the terminal 1000 are respectively intended to implement the corresponding procedure of each method in FIG. 3 to FIG. 5. For brevity, details are not further described herein.

Therefore, the terminal provided by this embodiment of the present disclosure monitors signal quality in a position in which the terminal is currently located, and when determining that the signal quality does not meet a preset condition, acquires a target position in which signal quality meets the preset condition, and instructs a user to move to the target position. Compared with some approaches in which a network device determines whether signal quality in a current position of a terminal meets a preset condition, the terminal can discover in time that signal quality in the position in which the terminal is located does not meet the preset condition, and therefore can effectively improve efficiency of guiding the user to move to a position in which signal quality meets a preset position.

Figure 11:
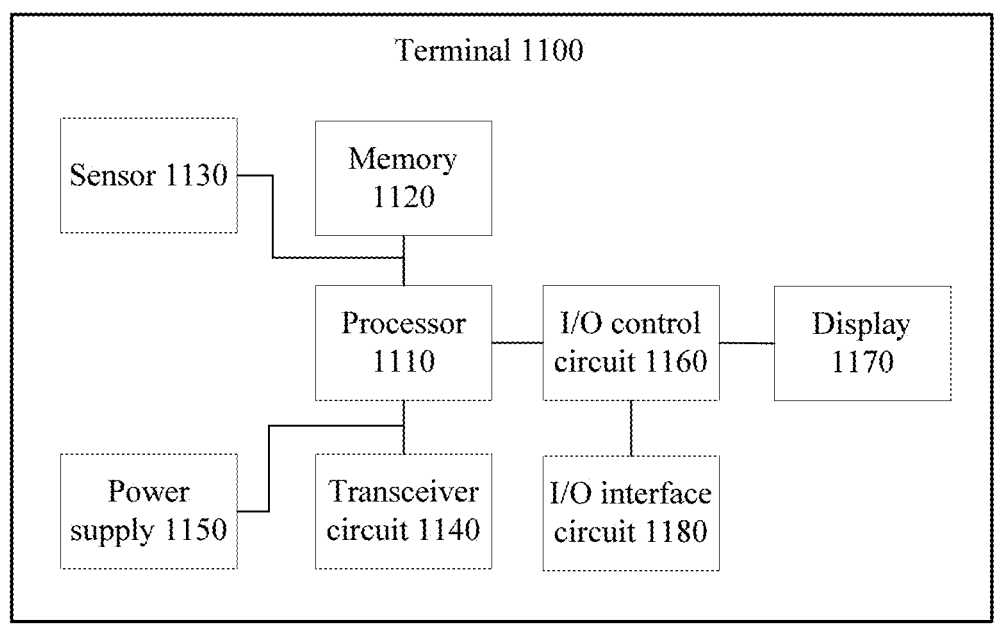
FIG. 11 is a schematic block diagram of a terminal according to still yet another embodiment of the present disclosure.

FIG. 11 shows a schematic block diagram of a physical structure of a terminal 1100 according to an embodiment of the present disclosure. As shown in FIG. 11, the terminal 1100 includes a processor 1110 configured to run operating system software and application software of the terminal, including an algorithm of the method for position guidance based on radio signal quality according to the embodiments of the present disclosure; a memory 1120 configured to complete storage of various software programs of the terminal, storage of data, running of software programs, and the like, where the memory 1120 may be one or more of a RAM, an erasable programmable read-only memory (EPROM), a solid state drive (SSD), a secure digital (SD) card, and a hard disk; and software corresponding to the method for position guidance based on radio signal quality according to the embodiments of the present disclosure is also run and stored in the memory 1120; a sensor 1130 configured to measure data, where the sensor 1130 may include one or more of the following: a GPS module, a gravity sensor, an acceleration sensor, a proximity sensor, a camera, an optical sensor, a microphone, and a loudspeaker; a transceiver circuit 1140 configured to provide a communications function, including one or more of a cellular network (global system for mobile (GSM)/universal mobile telecommunications service (UMTS)/long term evolution (LTE)/code division multiple access (CDMA) or the like), a wireless local area network (WLAN), near field communications (NFC), BLUETOOTH, and the like; a power supply 1150 configured to provide direct current power or convert alternating current power into direct current power; an input/output (I/O) interface circuit 1180 configured to provide an external interface, where optionally, the I/O interface circuit 1180 may include any one or more of the following interfaces: a universal serial bus (USB) interface, an SD card interface, and a push-button interface; a display 1170, which may be a display screen and a touchscreen of the terminal, where an indication icon exists on an upmost status bar of the display screen and is used to point to a position in which signal quality meets a preset condition, and the touchscreen is configured to receive a user touch operation and convert the user touch operation into a user operation instruction; and an I/O control circuit 1160 configured to control data interactions between various input and output circuit components, particularly, for example, data interactions between the processor 1110 and the I/O interface circuit 1180 and between the processor 1110 and the display 1170.

It should be understood that, the terminal 1100 according to this embodiment of the present disclosure may correspond to the first terminal in the method for position guidance based on radio signal quality in the embodiment of the present disclosure, or the terminal 1100 may correspond to the terminal 700, the terminal 900, and the terminal 1000 according to the embodiments of the present disclosure, and the foregoing and other operations and/or functions of each module in the terminal 1100 are respectively intended to implement a corresponding procedure of each method in FIG. 3 to FIG. 5. For brevity, details are not further described herein.

Therefore, the terminal provided by this embodiment of the present disclosure actively determines whether signal quality in a position in which the terminal is currently located meets a preset condition, which can effectively improve timeliness of guiding a user to move to a target position of better signal quality. In addition, an indication icon is displayed on a status bar, where the indication icon is used to guide the user to move from a position in which the user is currently located and in which signal quality is poor to a target position of better signal quality. Therefore, on a premise that a current operation task of the user is not affected, the user can be effectively guided to move to the position of better signal quality.

A person of ordinary skill in the art may be aware that, in combination with the examples described in the embodiments disclosed in this specification, units and algorithm steps may be implemented by electronic hardware or a combination of computer software and electronic hardware.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. A method for position guidance based on radio signal quality, the method comprising:
   acquiring a target position in which signal quality meets a preset condition when signal quality in a first position does not meet the preset condition, wherein a first terminal is currently located at the first position; and
   displaying an indication icon on a status bar of a user interface of the first terminal, wherein the indication icon indicates directions to the target position, and wherein the user interface comprises a user operation area, wherein acquiring the target position comprises:
      acquiring signal quality in positions in which at least two second terminals are respectively located, wherein the positions in which the at least two second terminals are respectively located comprise at least one position in which signal quality meets the preset condition, and distances from the positions in which the at least two second terminals are respectively located to the first position are both less than a preset threshold;
      determining at least one candidate position according to the signal quality in the positions in which the at least two second terminals are respectively located, wherein the at least one candidate position comprises a position in which signal quality meets the preset condition; and
      determining the target position in the at least one candidate position.

2. The method of claim 1, wherein the indication icon is an arrow icon, and the method further comprises adjusting a direction of the arrow icon in real time based, at least in part, on movement of the first terminal such that the arrow icon always points to the target position.

3. The method of claim 1, further comprising:
   determining a guiding path from the first position to the target position; and
   displaying, in the user operation area, map information marked with the guiding path.

4. The method of claim 3, wherein determining the guiding path from the first position to the target position comprises determining the guiding path based, at least in part, on prestored measurement data of signal quality in a surrounding area of the first position, wherein the surrounding area of the first position comprises the target position.

5. The method of claim 1, wherein when a signal quality in a second position in which the first terminal is located meets the preset condition before the first terminal arrives at the target position, the method further comprises at least one of:
hiding the indication icon; or
changing the indication icon from a directional state to a nondirectional state.

6. The method of claim 1, wherein when the first terminal arrives at the target position and signal quality in the target position meets the preset condition, the method further comprises at lest one of:
hiding the indication icon; or
changing the indication icon from a directional state to a nondirectional state.

7. The method of claim 1, wherein determining the target position comprises at least one of:
determining a position of best signal quality in the at least one candidate position, as the target position;
determining a position that is closest to the first position and in the at least one candidate position, as the target position; or
determining the target position according to a user instruction by displaying the at least one candidate position to the user.

8. The method of claim 1, wherein acquiring the target position further comprises:
sending, from the first terminal to a network device, a request message to request a recommended position in which signal quality meets the preset condition.

9. A method for position guidance based on radio signal quality, the method comprising:
determining, by a first terminal, whether signal quality in a first position meets a preset condition, wherein the first position is a position in which the first terminal is currently located;
acquiring, by the first terminal, a target position in which signal quality meets the preset condition when the signal quality in the first position does not meet the preset condition; and
displaying, by the first terminal, indication information that indicates directions to the target position, wherein acquiring, by the first terminal, a target position condition comprises:
acquiring, by the first terminal, signal quality in positions in which at least two second terminals are respectively located, wherein the positions in which the at least two second terminals are respectively located comprise at least one position in which signal quality meets the preset condition, and distances from the positions in which the at least two second terminals are respectively located to the first position are both less than a preset threshold;
determining, by the first terminal, at least one candidate position according to the signal quality in the positions in which the at least two second terminals are respectively located, wherein the at least one candidate position comprises a position in which signal quality meets the preset condition; and
determining, by the first terminal, the target position in the at least one candidate position.

10. The method of claim 9, wherein determining, by the first terminal, the target position comprises at least one of:
determining, by the first terminal, a position of best signal quality in the at least one candidate position, as the target position;
determining, by the first terminal, a position that is closest to the first position and in the at least one candidate position, as the target position;
determining, by the first terminal, the target position according to a user instruction by displaying the at least one candidate position to the user.

11. A terminal, comprising:
a processor configured to:
determine whether signal quality in a first position meets a preset condition, wherein the first position is a position in which the terminal is currently located;
acquire a target position in which signal quality meets the preset condition, when the signal quality in the first position does not meet the preset condition; and
display indication information that indicates directions to the target position, wherein the processor is further configured to:
acquire signal quality in positions in which at least two second terminals are respectively located, wherein the positions in which the at least two second terminals are respectively located comprise at least one position in which signal quality meets the preset condition, and distances from the positions in which the at least two second terminals are respectively located to the first position are both less than a preset threshold;
determine at least one candidate position according to the signal quality in the positions in which the at least two second terminals are respectively located, wherein the at least one candidate position comprises a position in which signal quality meets the preset condition; and
determine the target position in the at least one candidate position.

12. The terminal of claim 11, wherein the processor is further configured to:
determine a position of best signal quality in the at least one candidate position, as the target position.

13. The terminal of claim 11, wherein the processor is further configured to determine a position that is closest to the first position and in the at least one candidate position, as the target position.

14. The terminal of claim 11, wherein the processor is further configured to determine the target position according to a user instruction by displaying the at least one candidate position to the user.

15. The terminal of claim 11, wherein the processor is further configured to:
send to a network device a request message to request a recommended position in which signal quality meets the preset condition;
receive at least one recommended position from the network device in response to the request message; and
determine the target position according to the at least one recommended position.

* * * * *

UNITED STATES PATENT AND TRADEMARK OFFICE
CERTIFICATE OF CORRECTION

PATENT NO.        : 9,930,546 B2
APPLICATION NO.   : 15/483144
DATED             : March 27, 2018
INVENTOR(S)       : Huimin Zhang and Maosheng Huang It is certified that error appears in the above-identified patent and that said Letters Patent is hereby corrected as shown below:

In the Claims

Column 35; Line 12; Claim 6 should read:
comprises at least one of:

Signed and Sealed this
Eighth Day of May, 2018

Andrei Iancu
*Director of the United States Patent and Trademark Office*